United States Patent
Kimura et al.

(10) Patent No.: US 10,185,908 B2
(45) Date of Patent: Jan. 22, 2019

(54) INFORMATION CODE GENERATION APPARATUS AND INFORMATION CODE GENERATION PROGRAM PRODUCT

(71) Applicant: DENSO CORPORATION, Kariya, Aichi-pref. (JP)

(72) Inventors: Yousuke Kimura, Kariya (JP); Hiroki Ukai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/735,245

(22) PCT Filed: Jun. 13, 2016

(86) PCT No.: PCT/JP2016/002847
§ 371 (c)(1),
(2) Date: Dec. 11, 2017

(87) PCT Pub. No.: WO2016/208146
PCT Pub. Date: Dec. 29, 2016

(65) Prior Publication Data
US 2018/0181851 A1  Jun. 28, 2018

(30) Foreign Application Priority Data
Jun. 26, 2015  (JP) .................. 2015-128692

(51) Int. Cl.
G06K 17/00  (2006.01)
G06K 19/06  (2006.01)
G06F 17/30  (2006.01)

(52) U.S. Cl.
CPC . *G06K 19/06103* (2013.01); *G06F 17/30241* (2013.01); *G06K 19/06* (2013.01); *G06K 19/06037* (2013.01)

(58) Field of Classification Search
CPC ... G06K 7/10722; G06K 7/14; G06K 7/10732
(Continued)

(56) References Cited

U.S. PATENT DOCUMENTS

2002/0125317 A1* 9/2002 Hussey .............. G06K 7/10722
235/454
2012/0294488 A1* 11/2012 Boncyk ............. G06F 17/30259
382/103
(Continued)

FOREIGN PATENT DOCUMENTS

JP      H05027682 A    2/1993
JP      2002181565 A   6/2002
(Continued)

OTHER PUBLICATIONS

"Introduction of MapQR", [online], May 20, 2015, URL: https://www.youtube.com/watch?vH5imjHcZeJE.

*Primary Examiner* — Jamara Franklin
(74) *Attorney, Agent, or Firm* — Harness, Dickey & Pierce, P.L.C.

(57) ABSTRACT

An information code generation apparatus includes: a setting unit that specifies a destination position based on position specifying information included in coding information for generating an information code, wherein the setting unit acquires, from a database, environment information indicating information on a peripheral environment of the specified destination position, and sets a display range of a map image to be displayed by adjusting at least one of a center position or a display scale based on the destination position and the acquired environment information; and an information code generation unit that acquires, from the database, the map image having the display range set by the setting unit, and generates the information code by integrating the map image with the information code.

10 Claims, 26 Drawing Sheets

(58) Field of Classification Search
USPC .............................. 235/375, 454, 494, 462.01
See application file for complete search history.

(56) References Cited

U.S. PATENT DOCUMENTS

2015/0122889 A1* 5/2015 Amir ................ G06K 19/06037
235/462.09
2017/0116504 A1 4/2017 Kimura et al.

FOREIGN PATENT DOCUMENTS

| JP | 2005341369 A | 12/2005 |
| JP | 2009230729 A | 10/2009 |
| JP | 2015195022 A | 11/2015 |

* cited by examiner

FIG. 7

INPUT POINT INFORMATION
※PLEASE DESIGNATE LOCATION ON RIGHT MAP

POINT 1
- COORDINATES: 34.886496, 136.854395
- NAME: A CORPORATION
- TEL: NNN-111-2222

POINT 2
- COORDINATES: 34.890721, 136.887869
- NAME: B CORPORATION
- TEL: NNN-333-4444

POINT 3
- COORDINATES: 34.945897, 136.858172
- NAME: C CORPORATION
- TEL: NNN-555-6666

R20

R21

MAP CORRECTION SETTING

EXAMPLE OF SETTING DATA

| INTENDED PURPOSE | TYPE OF MAP | SCALE | PROCESSING METHOD |
|---|---|---|---|
| GUIDANCE FOR VEHICLE | ROAD MAP | 1/100000 | HIGHLIGHT MAIN ROAD AND MAJOR RIVER |
| | | | DELETE NARROW STREET |
| GUIDANCE FOR WALK FROM THE NEAREST STATION | TOWN MAP | 1/5000 | HIGHLIGHT STATION |
| | | | HIGHLIGHT MAIN BUILDINGS |
| GUIDANCE FOR TRAIN TO THE NEAREST STATION | ROUTE MAP | 1/50000 | HIGHLIGHT NEAREST STATION |
| | | | HIGHLIGHT TRANSFER STATION |

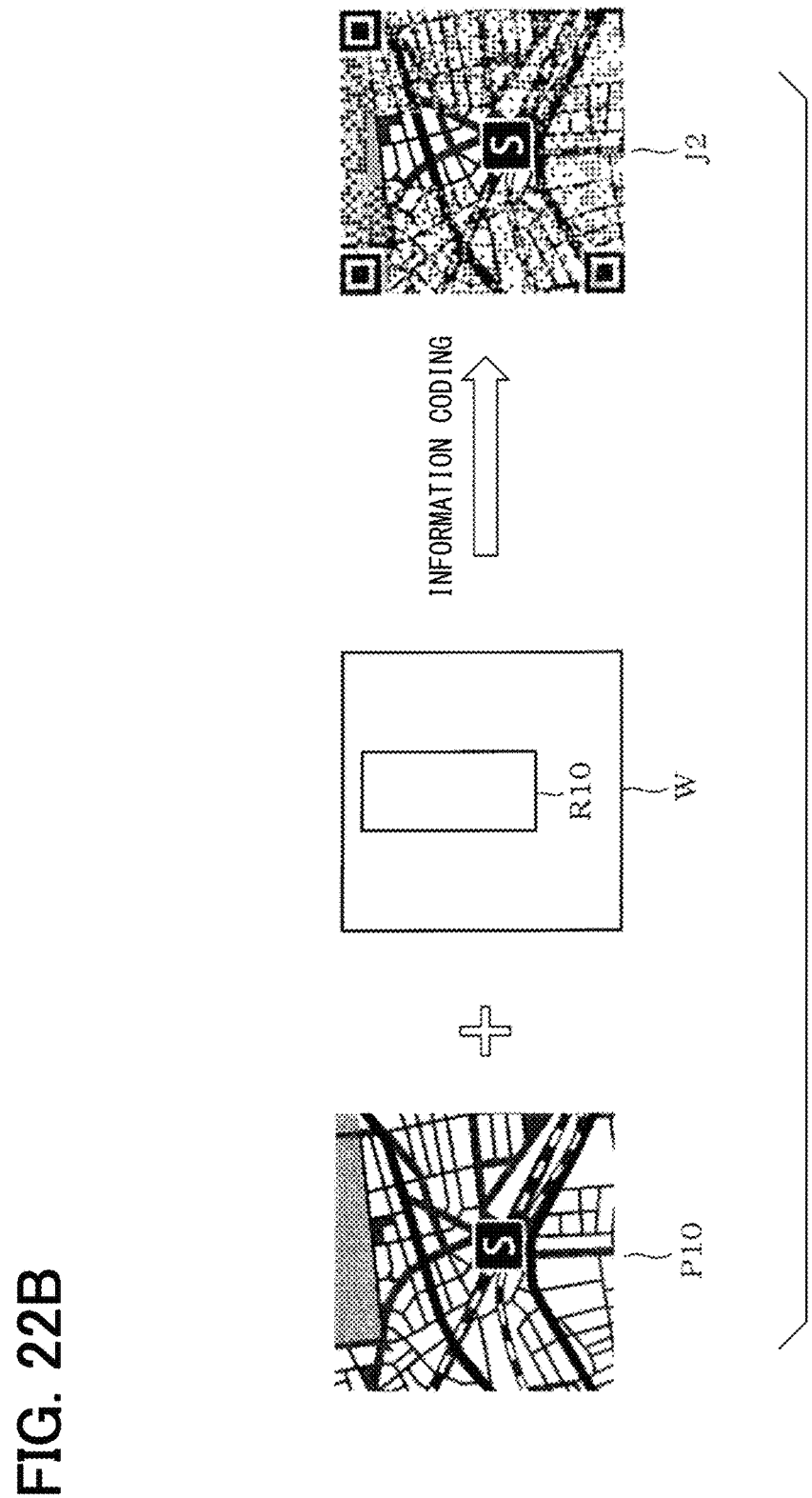

INFORMATION CODE GENERATION APPARATUS AND INFORMATION CODE GENERATION PROGRAM PRODUCT

CROSS REFERENCE TO RELATED APPLICATIONS

This application is a U.S. National Phase Application under 35 U.S.C. 371 of International Application No. PCT/JP2016/002847 filed on Jun. 13, 2016 and published in Japanese as WO 2016/208146 A1 on Dec. 29, 2016. This application is based on and claims the benefit of priority from Japanese Patent Application No. 2015-128692 filed on Jun. 26, 2015. The entire disclosures of all of the above applications are incorporated herein by reference.

TECHNICAL FIELD

The present disclosure relates to an information code generation apparatus and an information code generation program product each of which generates an information code.

BACKGROUND ART

Generally, an information code is generated on the premise that the information code is read by a reading device. For that reason, it is difficult for a person to visually grasp what kind of information is included in the information code only by seeing the information code. For that reason, a descriptive text may be added around the information code, a company name or the like may be superimposed on the information code, or an image designed in advance may be superimposed and displayed as in Patent Literature 1, for example.

PRIOR ART LITERATURES

Patent Literature

Patent Literature 1: JP 2009-230729 A

SUMMARY OF INVENTION

In a case where information that can identify a position is included in coding information input for generating the information code (hereinafter referred to as position specifying information), it is conceivable to generate an information code integrated with a map image including the position specified by the position specifying information (hereinafter referred to as the destination position). This is because the information code integrated with such a map image can visually present the destination position without reading the information code using a reading device.

By the way, when generating the information code integrated with the map image, it is generally considered that the destination position is set at the center of the map image in order to clearly indicate the destination position.

However, even if the destination position is clearly indicated on the map image, there are cases in which the destination position cannot be grasped by a user. For example, in the case of a user who is geographically unfamiliar with the destination position, even if the destination position is clearly indicated, the user may fail to recognize the geography in the vicinity of the destination position. Eventually it is difficult for the user to grasp where the destination position is. In this way, in order to present the destination position to the user who sees the information code in an easy-to-understand manner, it is important not only to indicate the destination position on the map image but also indicate the destination position in an understandable manner.

The present disclosure has been made in view of the above circumstances, and it is an object of the present disclosure to provide an information code generation apparatus and an information code generation program product each of which generates an information code capable of presenting a destination position in an easy-to-understand manner to a user who sees the information code when integrating the map image in the information code for generating the information code.

According to an aspect of the present disclosure, an information code generation apparatus includes: a setting unit that specifies a destination position based on position specifying information included in coding information for generating an information code, acquires, from a database, environment information indicating information on a peripheral environment of the specified destination position, and sets a display range of a map image to be displayed by adjusting a center position and/or a display scale based on the destination position and the acquired environment information; and an information code generation unit that acquires, from the database, the map image having the display range set by the setting unit, and generates the information code by integrating the map image with the information code.

According to the above generation apparatus, when generating the information code integrated with the map image, the destination position can be displayed in an easy-to-understand manner to the user who sees the information code.

According to another aspect of the present disclosure, an information code generation program product stored in a computer-readable non-transitory tangible storage medium is provided. The program product comprises instructions to be executed by a computer, the instructions for implementing: specifying a destination position based on position specifying information included in coding information for generating an information code; acquiring, from a database, environment information indicating information on a peripheral environment of the specified destination position; setting a display range of a map image to be displayed by adjusting at least one of a center position or a display scale based on the destination position and the acquired environment information; acquiring the map image having the set display range; and generating the information code by integrating the acquired map image with the information code.

According to the above program product, when generating the information code integrated with the map image, the destination position can be displayed in an easy-to-understand manner to the user who sees the information code.

BRIEF DESCRIPTION OF DRAWINGS

The above and other objects, features and advantages of the present invention will become more apparent from the following detailed description made with reference to the accompanying drawings. In the drawings:

FIG. 7 is a diagram showing an example of the input screen for the point information in a situation B;

FIG. 17 is a diagram illustrating an example of setting data registered in a setting DB;

FIG. 22B is a diagram schematically showing an example of an information code generated when setting a non-coding area;

EMBODIMENTS FOR CARRYING OUT INVENTION

Hereinafter, embodiments of the present disclosure will be described with reference to FIGS. 1 to 15.

Figure 1:
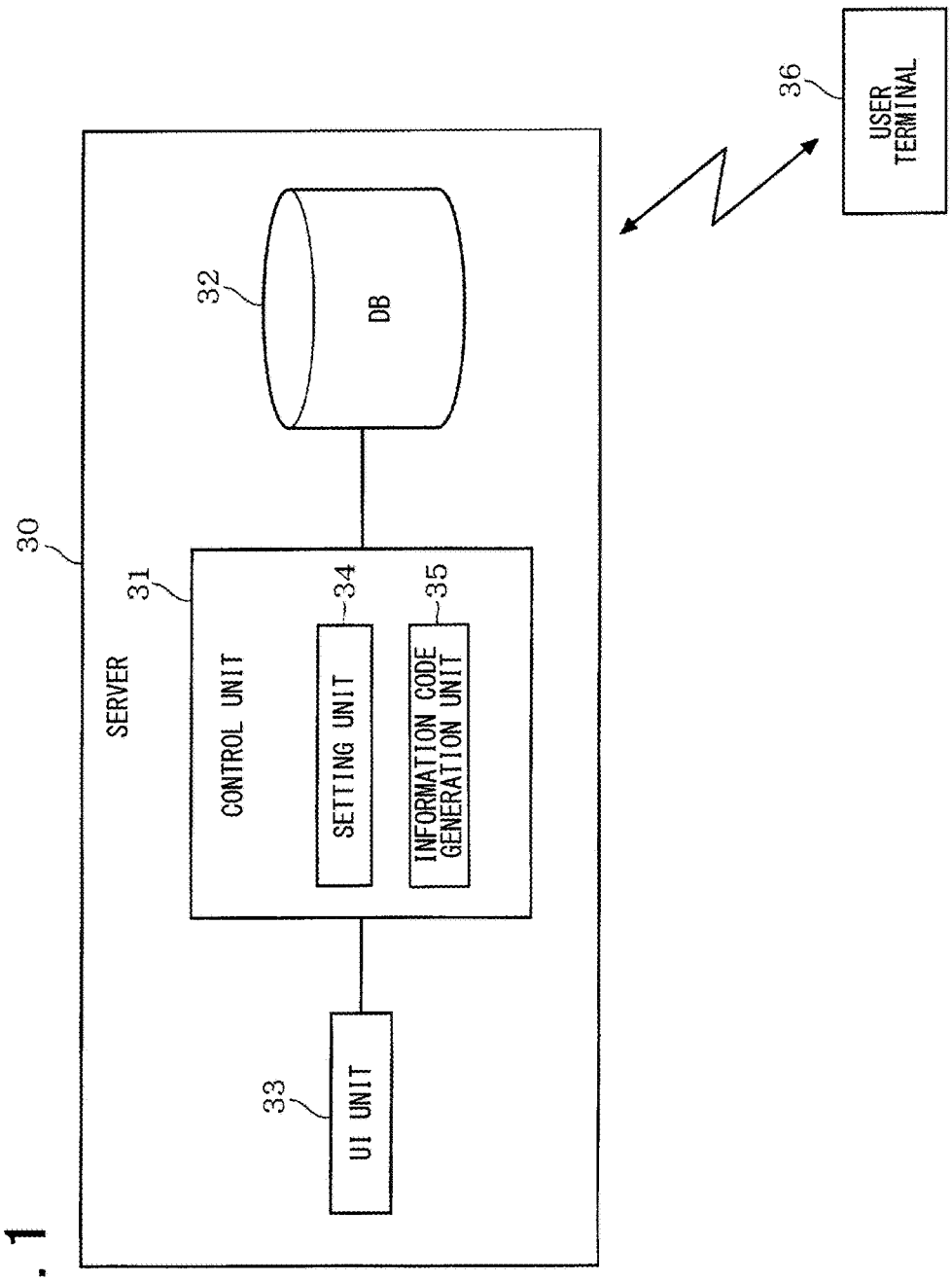
FIG. 1 is a diagram schematically showing a configuration of an information code generation apparatus according to an embodiment of the present disclosure.

As shown in FIG. 1, an information code generation apparatus 30 includes a control unit 31, a database (hereinafter referred to as DB (data base)) 32, a UI (user interface) unit 33, and the like. The information code generation apparatus 30 according to the present embodiment is configured as a so-called server. Although not shown, the information code generation apparatus 30 can be connected with input devices such as a keyboard and a mouse and a display device such as a display. For that reason, although the generation of an information code to be described later can be performed on the side of the information code generation apparatus 30, independently, the UI unit 33 (corresponding to an operation input unit) is configured, for example, as a WEB interface, thereby being capable of generating the information code from a user terminal 40 over a network.

The control unit 31 is configured by a computer having a CPU, a ROM, a RAM and the like not shown, and controls the entire information code generation apparatus 30. Further, the control unit 31 is provided with a setting unit 34 and an information code generation unit 35. In the present embodiment, the setting unit 34 and the information code generation unit 35 are configured in software by a computer program that is executed by the control unit 31.

Although will be described in detail later, the setting unit 34 determines whether a position specifying information that can specify a position is included in coding information input for generating an information code, or not, specifies a destination position based on the position specifying information, acquires environment information which is information on a peripheral environment of a specified destination position from a database, and adjusts a center position and/or a display scale to be displayed as a map image based on the destination position and the acquired environment information to set a display range to be displayed as the map image. In this example, the environment information includes POI information that can specify POI (point of interest) in the vicinity of the destination position, and terrain information that can specify the terrain around the destination position.

Although will be described in detail later, the information code generation unit 35 acquires the map image in a display range set by the setting unit 34 from the DB 32, and generates an information code integrated with the acquired map image. It is to be noted that the information code integrated with the map image is directed to information code by which, when the user views the generated information code, the user can visually grasp that the information code is a map, and the user also can visually grasp the destination position by the displayed map image.

The DB 32 stores map data for displaying a map image. In the map data, various data for displaying the map image such as names of roads, rivers, stations, railroads, facilities, and telephone numbers are registered. In the map data, data enabling identification of positions (coordinates) such as longitudes, latitudes, and map codes, setting data for changing display contents when the display scale is changed, and the like are also registered. The DB 32 is not necessarily built in the information code generation apparatus 30, and may be configured to cooperate with an external database.

Next, action of the configuration described above will be described.

In the following description, a plurality of modes (mode A to mode D) for generating the information codes will be described, but for the sake of simplicity of description, a flow of an image coding process shown in FIG. 2 will be described first for the mode A, and a detailed description of the image coding process will be omitted for the mode B to the mode D. Note that the image coding process is a computer program executed by the control unit 31.

<Mode A: Case of Only One Destination Position. Refer to FIGS. 2 to 6>.

Figure 2:
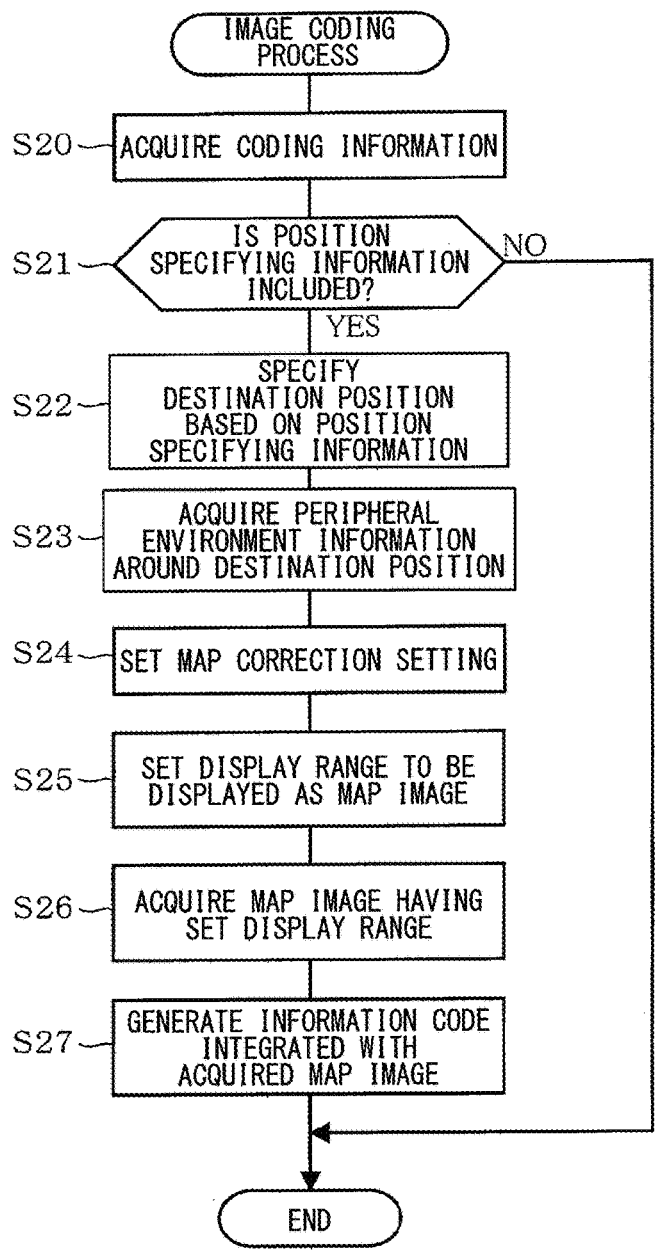
FIG. 2 is a diagram showing a flow of image coding processing by the information code generation apparatus.

The information code generation apparatus 30 executes the image coding process shown in FIG. 2, and first acquires the coding information (S1). At this time, the information code generation apparatus 30 acquires a point information (corresponding to the position specifying information) relating to a point (corresponding to the destination position) to be provided as an information code input from a point information input screen exemplified in FIG. 3 as coding information. In the following description, the case where the information code is generated independently by the information code generation apparatus 30 (that is, the server) is described as an example. Alternatively, the coding information transmitted from a user terminal 36 may be acquired.

Figure 3:
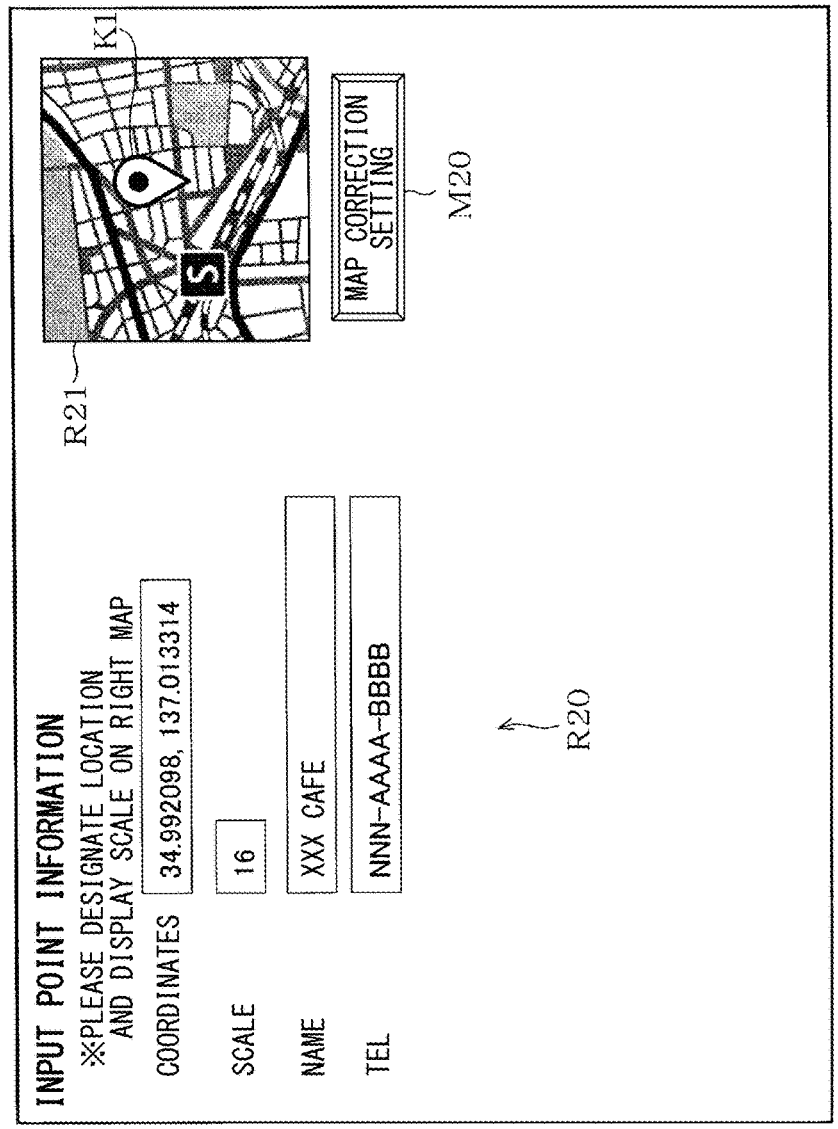
FIG. 3 is a diagram showing an example of an input screen for point information in a situation A.

The point information input screen in FIG. 3 is provided with a point information input area R20, a map display area R21, and a migration button M20 for migrating to a map correction setting screen to be described later. A code creator enters, for example, point coordinates (for example, longitude and latitude), a display scale, a name (facility name etc.), a telephone number and the like of the destination position from the point information input screen.

As for the point coordinates, numerical values can be entered, but as an initial state, a map image having a size based on the current position, past history or the like is displayed in the map display area R21, and the latitude and longitude of the position may be substituted for the point coordinates by designating an arbitrary position on the map image.

Among the input point information, the point coordinates are information that can directly specify the destination position. In addition, names and telephone numbers are registered in the map data for those that are open to the public, and therefore may serve as information that can indirectly specify the destination position. In other words, those point coordinates, names (appellation), telephone numbers, and the like can be treated as position specifying information. Names or telephone numbers that are not disclosed, or names or a telephone numbers that are not registered in the map data are not treated as the position specifying information. Further, a destination position mark K1 is displayed at a location corresponding to the point coordinates input by the code creator or designated from the map image.

Upon acquiring the coding information, the information code generation apparatus 30 determines whether the coding information includes the position specifying information, or not (S21), and if the position specifying information is not included (no in S21), the processing is completed. On the other hand, when the position specifying information is included (yes in S21), the information code generation apparatus 30 specifies the destination position based on the position specifying information (S22), and acquires environment information around the destination position (S23).

Subsequently, the information code generation apparatus 30 performs map correction setting based on the destination position and the environment information (S24). The map correction setting is provided for setting a condition for adjusting a display range to be displayed as the map image.

Figure 4:
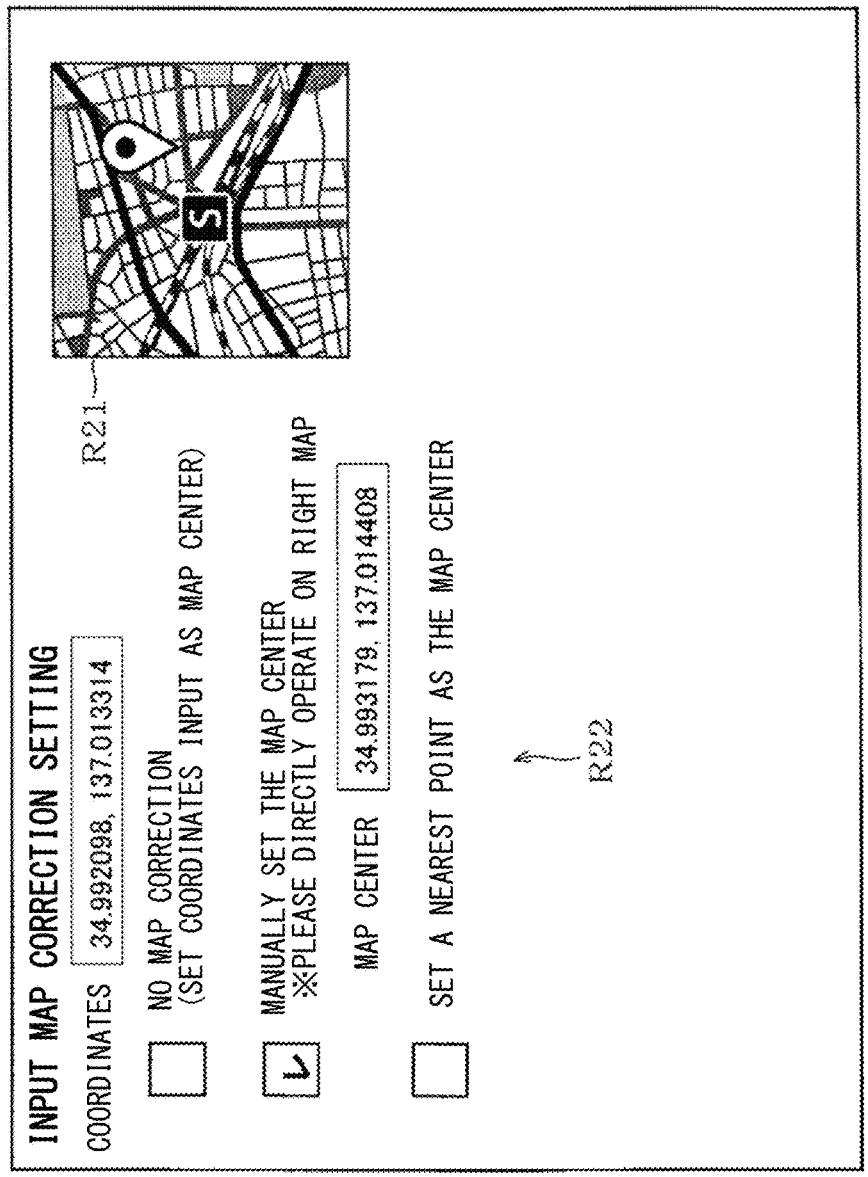
FIG. 4 is a diagram showing a first example of an input screen for map correction setting in the situation A.

For example, a migration button M20 shown in FIG. 3 is operated so that the code creator can switch an operation screen to the map correction setting screen shown in FIG. 4. Then, the code creator enters the map correction setting from the map correction setting screen. In the map correction setting, for example, the following three modes of "no map correction", "manually set the map center", "set a nearest point as the map center" can be set.

"No map correction": The display range is not changed.

"Manually set the map center": The center position of the map image is directly set. In this case, a display scale of the map image set by "scale" in FIG. 3 is used. The display scale may be changeable as the map correction setting.

"Set a nearest point as the map center": Set a station, a building, or the like existing around the point coordinates to the center position of the map image.

In the case of FIG. 4, a state in which "manually set the map center" is selected as the map correction setting, and the code creator designates the center position of the map image (indicated as the center of the map in FIG. 4). It should be noted that although a numerical value may be input, an arbitrary position on the map image displayed in the map display area R21 may be designated, or a map center may be designated by moving the map image by dragging.

Figure 5:
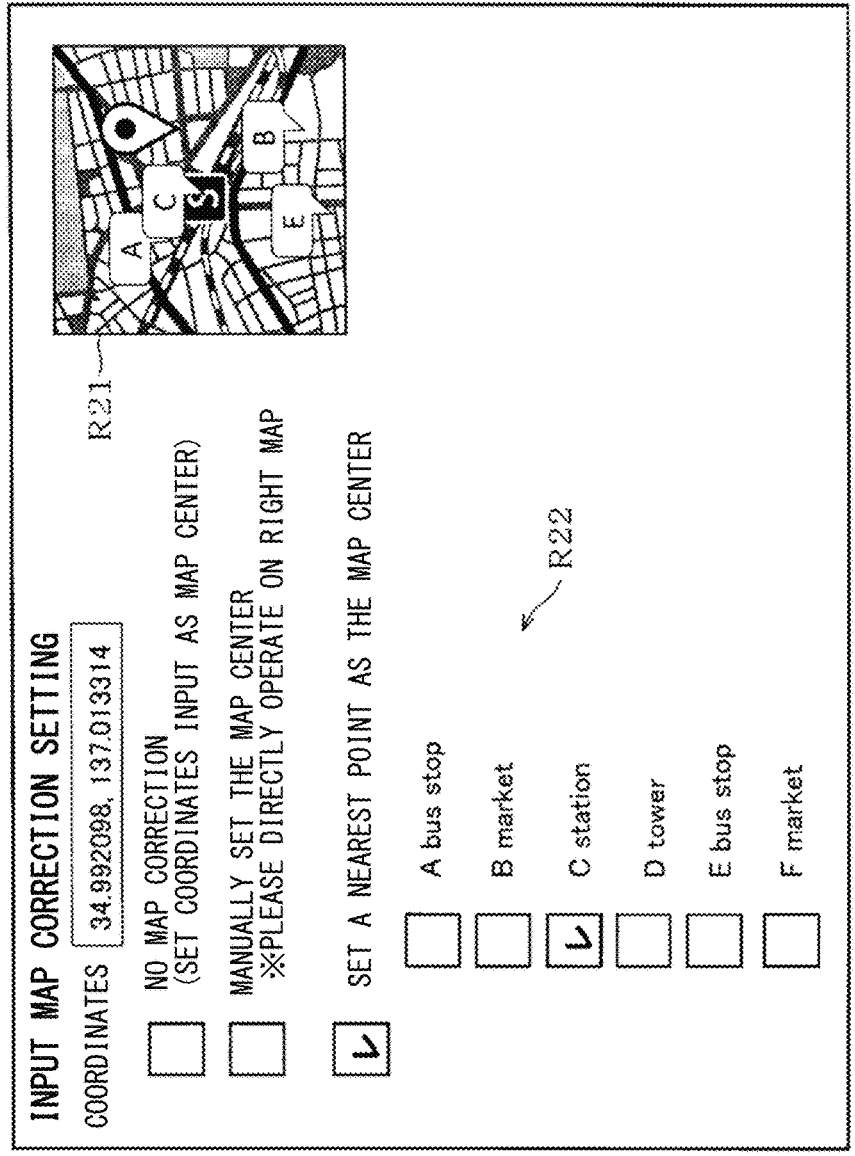
FIG. 5 is a diagram showing a second example of the input screen for the map correction setting in the situation A.

In addition, when "set a nearest point as the map center" is selected, the information code generation apparatus 30 displays the positions (positions indicated by symbols A, B, C, and D in FIG. 5) of the POI around the destination position specified based on the environment information on the map image, for example, as shown in FIG. 5. At the same time, the information code generation apparatus 30 displays a selection column indicating which POI is set as the center position in a selection area R22.

As the nearest point, the POI which exists around the destination position and is thought to be relatively easily understood by anyone is selected in a size set by "scale" in FIG. 3. Examples of this POI are "A bus stop" (bus stop), "B market" (store), "C station" (station), "D tower" (TV tower, radio tower, or the like), "E bus stop" bus stop different from "A"), "F market" (store different from "B"), and so on.

FIG. 5 shows a state in which "C station" is selected, and the information code generation apparatus 30 selects a station nearest to the destination position (the position indicated by the symbol C on the map image) as the center position of the map image. In other words, the information code generation apparatus 30 selects one or more POIs to be displayed on the map image among the POIs specified by the POI information, and sets an area including the destination position and the selected POI as the display range.

When the map correction setting is performed, the information code generation apparatus 30 sets a display range to be displayed as the map image based on the destination position, the environment information, and the map correction setting (S25). Incidentally, the display range that is finally set is substantially the same as an area of the map image displayed on the point information input screen shown in FIG. 3, or an area of the map image displayed on the map correction setting screen shown in FIGS. 4 and 5. For that reason, the code creator can confirm the map image that is finally displayed on the point information input screen or the map correction setting screen.

Figure 6:
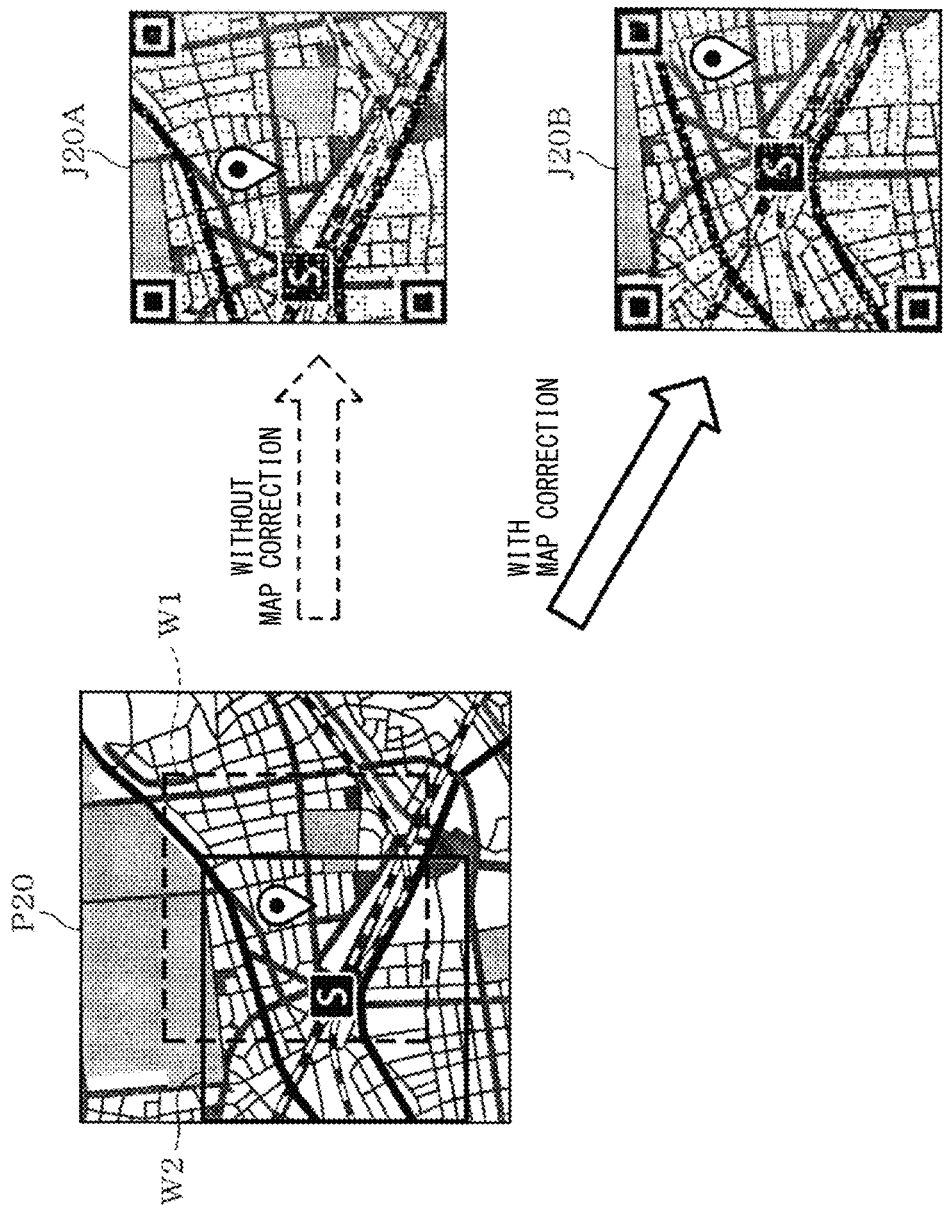
FIG. 6 is a diagram showing an example of an information code generated in the situation A, together with a reference example.

The information code generation apparatus 30 acquires the map image in the set display range from the DB 32 (S26), and generates an information code integrated with the acquired map image (S27). More specifically, as shown in FIG. 6, the information code generation apparatus 30 generates the information code integrated with the map images within the display range set as the area including the destination position. Incidentally, FIG. 6 illustrates a map image P20 in a wide area to some extent for comparison.

FIG. 6 shows an area W1 indicated by a dotted line as a reference example and an area W2 indicated by a solid line as the embodiment. In this example, the area W1 represents a display range in the case where the map correction is not performed centering on the destination position, for example, in the case where "no map correction" is selected in FIG. 4. In addition, the area W2 is a display range in the case where there is a map correction centered on a location different from the destination position, for example, when "C station" is selected in FIG. 5.

In this case, when the area W1 is set as the display range, the information code generation apparatus 30 generates an information code J20A in which the destination position is in the center of the map image. On the other hand, when the area W2 is set as the display range, the information code generation apparatus 30 generates an information code J20B in which a location different from the destination position, in this case, a station nearest to the destination position is in the center of the map image.

In the case of the information code J20B, the information code generation apparatus 30 performs adjustment such that the POI (in this case, the station) existing at the position different from the destination position become at the center position based on the destination position and the environment information. In other words, the information code generation apparatus 30 selects one or more POIs to be displayed on the map image among the POIs specified by the POI information, and sets an area including the destination position and the selected POI to the display range.

As a result, the user who sees the information code J20B can grasp that the destination position is in the vicinity of the station C. In other words, the display range in which a station that is easily used by everyone as a marker is set to come to the center of the map image is set, thereby being capable of presenting where the destination position is relative to the user that sees the information code, and how to move from the station to reach the destination position, in an easy-to-understand manner.

When the POIs specified by the POI information include a preset specific type of POI, for example, when the station is set as the specific type of POI, the station nearest to the destination position may be set to the center of the display range. As a result, the information code can be easily generated in the case where there are multiple POIs of the specific type such that the multiple stations are present around.

Alternatively, when the POIs specified by the POI information include the multiple POIs of the preset specific type, the area including all of the specific type of POIs may be set as the display range. For example, if there are multiple bus stops and any bus stop is at the same distance, all bus stops may be displayed. As a result, multiple options can be provided to the user.

Meanwhile, the type of POIs may be made different between a case where the nearest POI among the specific type of POIs is centered and a case where all of the POIs of the specific type are displayed, and the nearest POI of a certain type may be set at the center position of the map image while all of the POIs of the certain type are displayed.

FIG. 6 shows an example in which the entire map image is coded in information, that is, an example of an information code on which a part or all of the map image is superimposed. Alternatively, an information code on which a part or all of the map image are not superimposed may be generated as in a mode C to be described later. The map image may be simplified as in a first reference example to be described later, or the information code may be generated with the provision of a non-coding area as in a second reference example to be described later.

Depending on the destination position, both of the center position and the display scale may be changed, or only the center position or only the display scale may be changed. The same is applied to the modes B to D which will be described later.

In the case of FIG. 6, since the station C also falls within the display range in the information code J20A, it seems that the position can be understood without any change in the display range. This is because the destination position is accidentally present in the vicinity of the station C. In other words, when the destination position is far from the station C or the like, there is a possibility that the station C does not fall within the display range in the map image centered on the destination position. Therefore, a case in which the center position and the display scale are changed as in the present embodiment is significant for such a possibility.

Also, this mode exemplifies the designation of the center position of the map image by the code creator ("manually set the map center" shown in FIG. 4). Alternatively, the designation of the display scale, the designation of the center position by designating the amount of deviation from the destination position, the designation of the center position and/or the display scale by entering the position information that can specify a target position different from the destination position or position information that can specify the target position, for example, that a relatively large map image is displayed, and the display range is designated directly with a rectangular frame by the code creator, as with the map image P20 shown in FIG. 6, that is, a direct destination of the display range by the code creator may be entered.

In this case, the designation of the amount of deviation from the destination position represents a designation method in which a relative position (for example, a coordinate difference, a distance, and a direction) from the destination position is designated, and the designated position is set in the center of the map. In this case, one or more coordinates and position information other than the destination position may be designated, and the map center and/or the display scale may be adjusted with the inclusion of the destination position and the designated target position. In other words, the target position includes not only POI different from the target position but also a location purely set by coordinates and the like. Such a designation method is useful, for example, when it is desired to display a lake and the like around the destination position on the map image, and the like.

Figure 8:
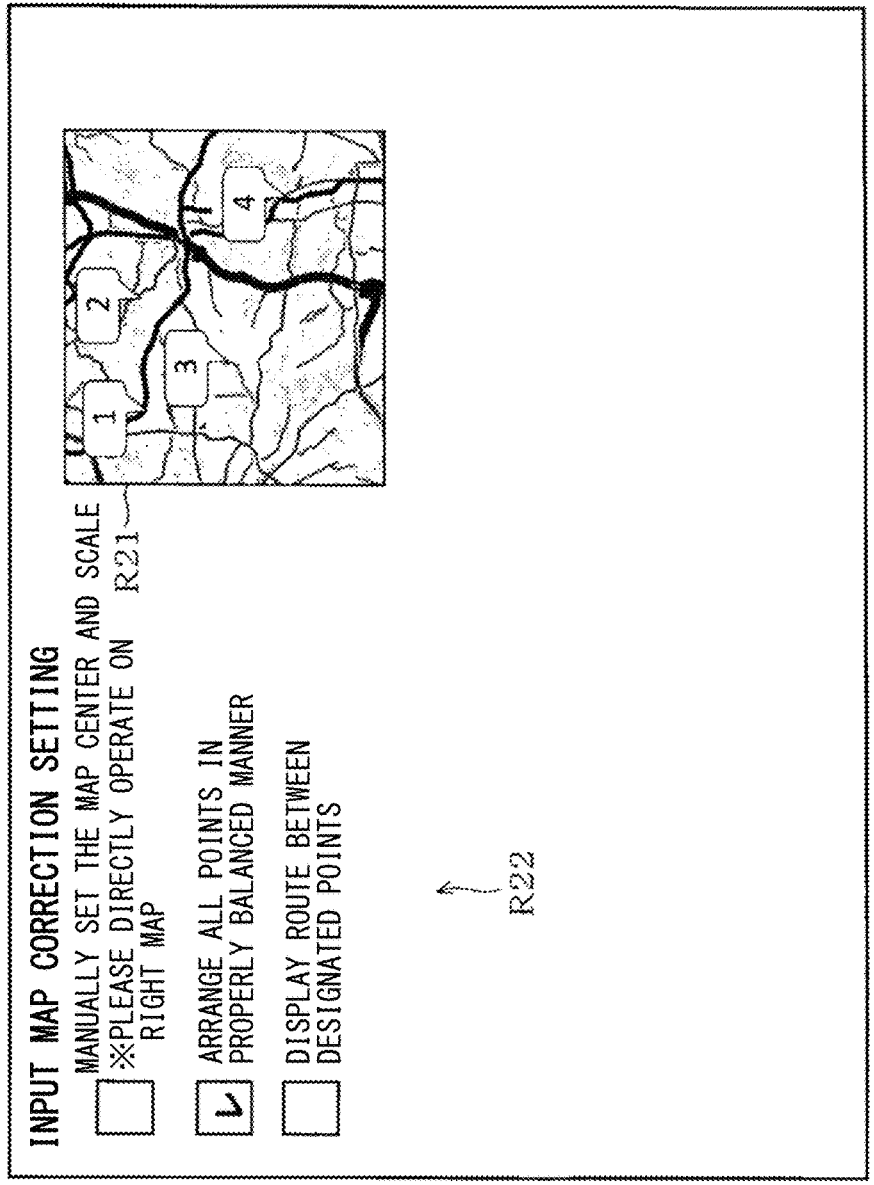
FIG. 8 is a diagram showing an example of the input screen for the map correction setting in the situation B.
Figure 9:
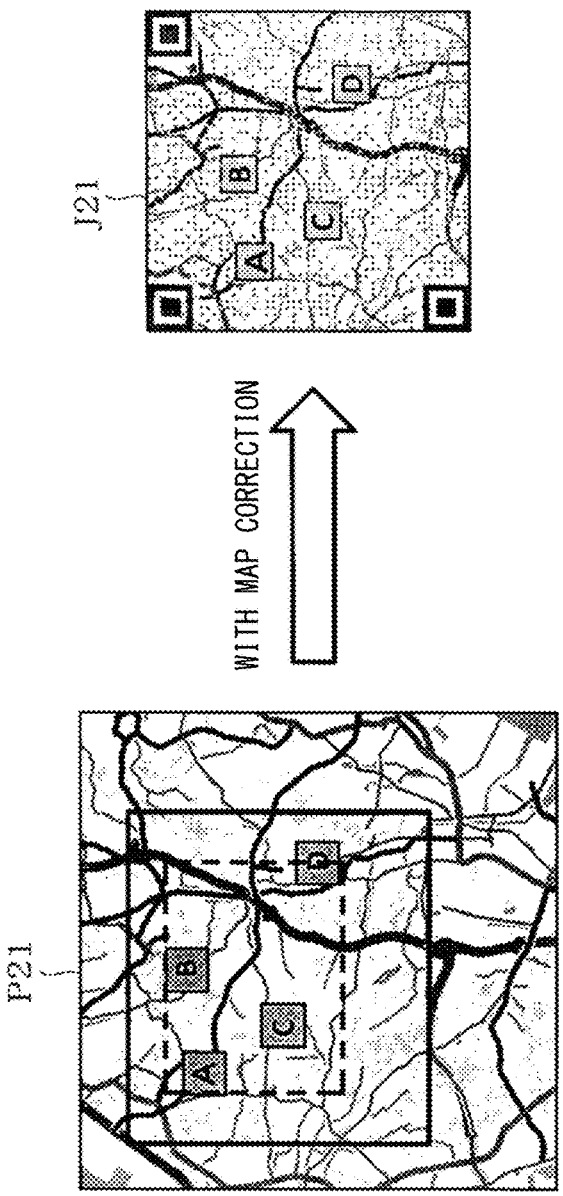
FIG. 9 is a diagram showing an example of the information code generated in the situation B.

<Mode B: Case of Multiple Destination Positions. Refer to FIGS. 7 to 9>.

As shown in FIG. 7, the mode B is an example in which multiple pieces of point information of, for example, points 1 to 4 are entered from the point information input screen. In this case, in the display scale in an initial state, for example, the point 4 falls outside the map image displayed in the map display area R21. For that reason, if the information code is generated as it is, the point 4 is not to be displayed on the map image, and the user cannot visually grasp the position of the point 4.

Therefore, the information code generation apparatus 30 sets an area including the point 4 as the display range of the map image based on the map correction setting. Specifically, as shown in FIG. 8, in the case of the present embodiment, as shown in FIG. 8, the following three modes of "manually set the map center and scale", "arrange all points in properly balanced manner", and "display route between designated points" as the map correction setting can be set.

"Manually set the map center and scale": Designation of the center position and/or the display scale of the map image by the code creator, or direct destination of the display range by the code creator.

"Arrange all points in properly balanced manner": The center position and/or the display scale are changed so as to display all of the destination positions in the map image, and the respective destination positions are automatically arranged in the map image in the properly balanced manner.

"Display route between designated points": When there are multiple destination positions, and a travel route exists between the respective destination positions, an area including the travel route is set as the display range.

FIG. 8 shows a state in which "arrange all points in properly balanced manner" is selected as the map correction setting, and shows a state in which the display scale and the center location in the map image of FIG. 7 are changed to set the display range so that all the destination positions fall within the map image. Specifically, as shown in FIG. 9, since the display range indicated by a broken line in a map image P21 is set in an initial state, a position of D (the location of "4" in FIG. 8) is not displayed on the map image. However, with the map correction setting, an area indicated by a solid line in the map image P21 is set as the display range.

The information code generation apparatus 30 acquires the map image in the set display range, and generates an information code integrated with the acquired map image. As a result, as shown in FIG. 9, all the destination positions (positions indicated by symbols A to D in FIG. 9) are displayed in an information code J21. Therefore, even when the multiple destination positions are set, the destination positions can be presented to the code creator who sees the information code in an easily understandable manner.

When there is a travel route (or set by the code creator) such as point 1, point 2, point 3, and point 4, the display range may be set so as to also include the travel route as in the mode C to be described later.

Also, the number of input destination positions is not limited to the above example.

Figure 10:
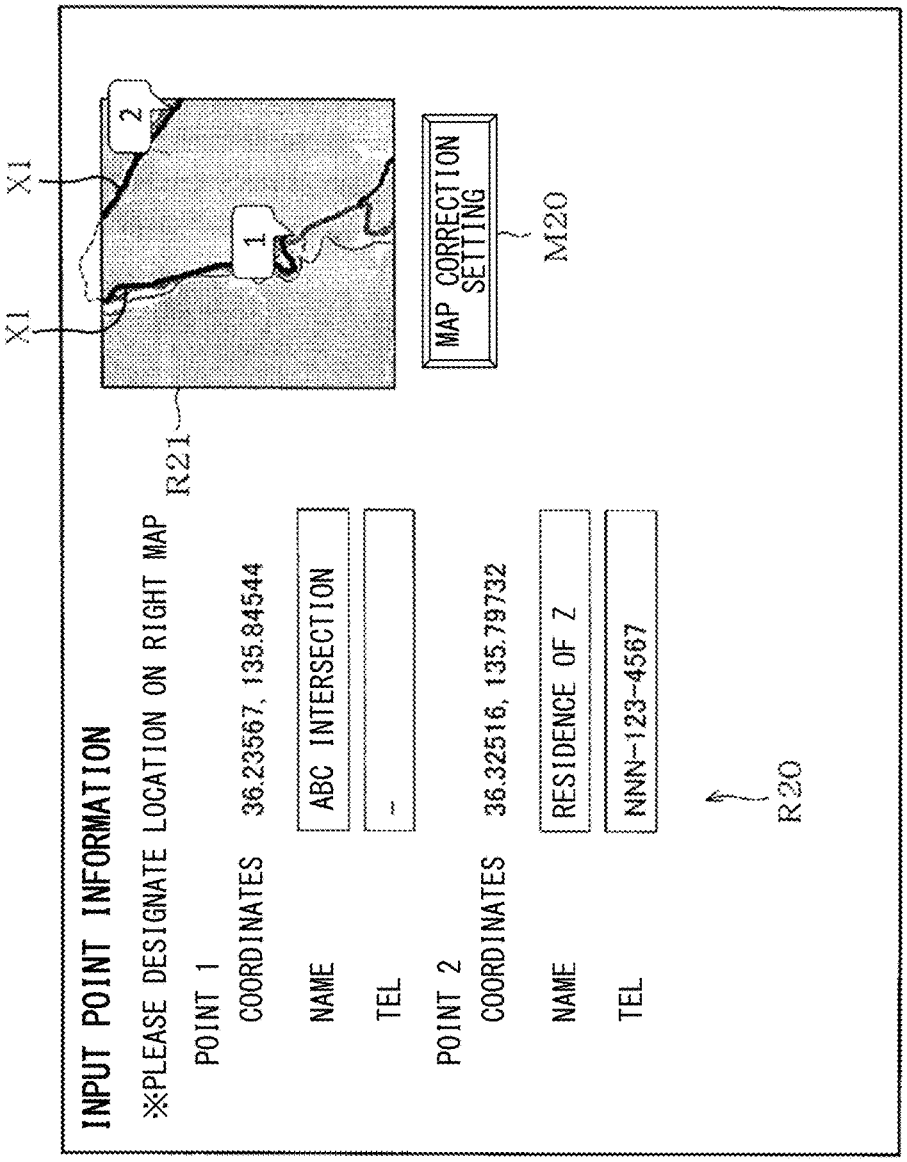
FIG. 10 is a diagram showing an example of the input screen for the point information in a situation C.
Figure 11:
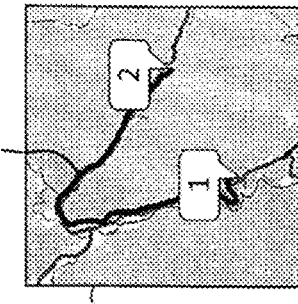
FIG. 11 is a diagram showing an example of the input screen for the map correction setting in the situation C.
Figure 12:
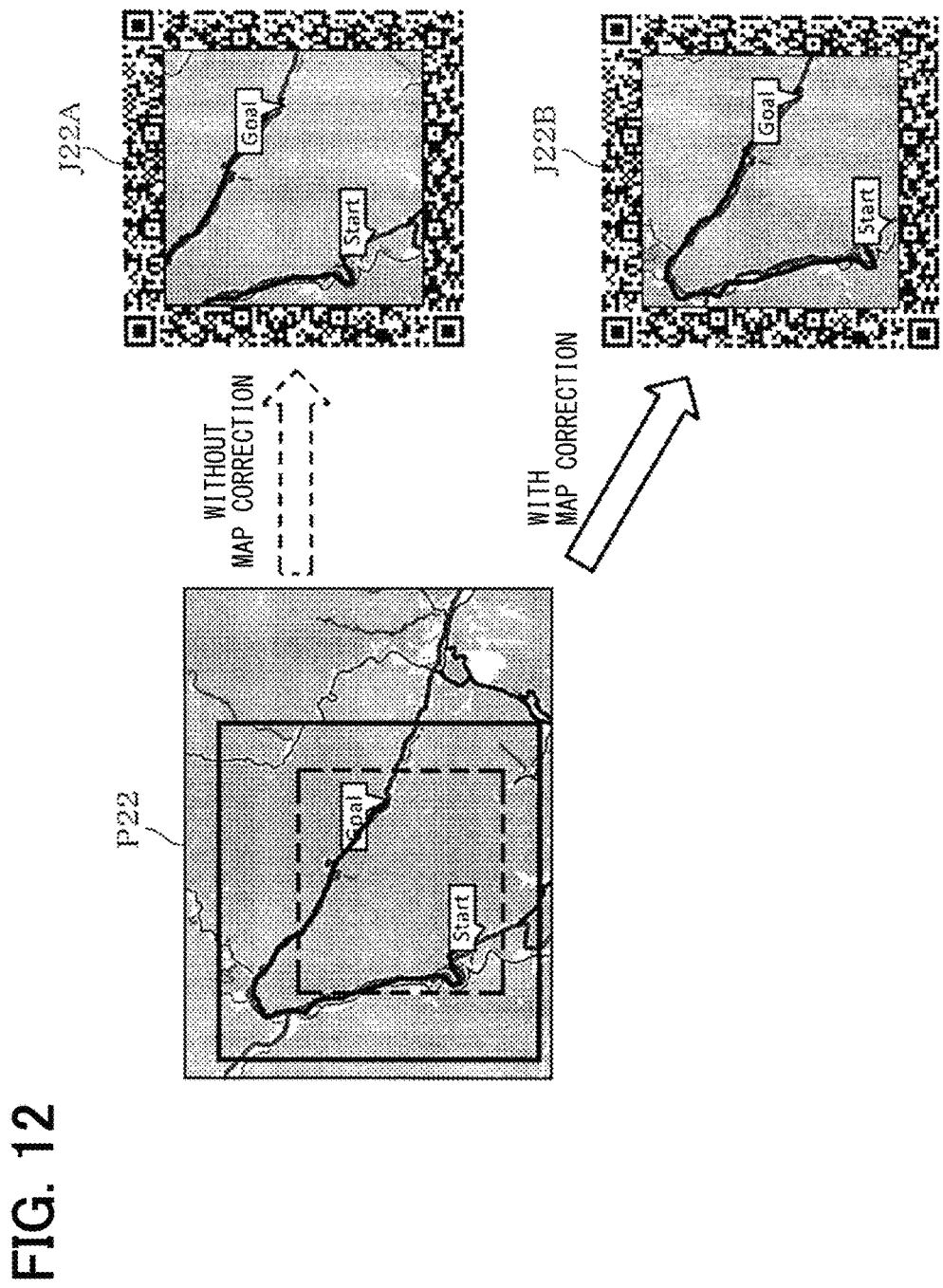
FIG. 12 is a diagram showing an example of the information code generated in the situation C, together with a reference example.

<Mode C: Case where there is a Route. Refer to FIGS. 10 to 12>.

As shown in FIG. 10, the mode C is an example in which multiple pieces of point information of, for example, the points 1 and 2 are entered from the point information input screen. A route X1 (a travel route from the point 1 to the point 2) is present between those two points 1 and 2. Although not shown, the route X1 is generated by setting whether to create a route between the points, or not, and the operation by the code creator.

In this case, in the display scale in the initial state shown in the map display area R21, the route X1 falls outside the map image. For that reason, if the information code is generated as it is, how long the route X1 is cannot be grasped.

Therefore, the information code generation apparatus 30 sets an area including the route X1 as the display range of the map image based on the map correction setting. Specifically, as shown in FIG. 11, when the "display route between designated points" is selected as the map correction setting, the information code generation apparatus 30 can display the overall route X1 on the map image with a change in the center position and/or the display scale as with the map image shown in the map display area R21.

The information code generation apparatus 30 acquires the map image in the set display range, and generates an information code integrated with the acquired map image. At this time, as shown in FIG. 12, when an information code J21A is generated without the map correction, the route X1 is not displayed between a Start (in this case, point 1. departure place) and a Goal (in this case, point 2. destination). On the other hand, when an information code J21B is generated with the map correction, the route X1 is displayed between the Start and the Goal.

In this way, in the case where there is the route between the multiple destination positions, the route is displayed on the map image, thereby being capable of presenting where the destination positions are, and how to travel in any route to the user who sees the information code in an easy-to-understand manner.

At this time, the route is displayed thickly or the information code is generated in color to identifiably display the route, thereby being capable of presenting the route in the further easily understandable manner.

When an target position different from the destination position or position information that can specify the target position is designated, and a travel route is present between the destination position and the target position, the area including the travel route may be set as the display range. For example, it is conceivable to set the departure place of a hiking course as the destination position, set the nearest station as the target position, and set an area including a route from the nearest station to the departure place as the display range. As a result, a route to the departure place of the hiking course can be presented in an easy-to-understand manner to, for example, a participant from a distant place.

This case can be combined with the mode A described above by setting the target position to the nearest POI (for example, a station) or the like.

Figure 13:
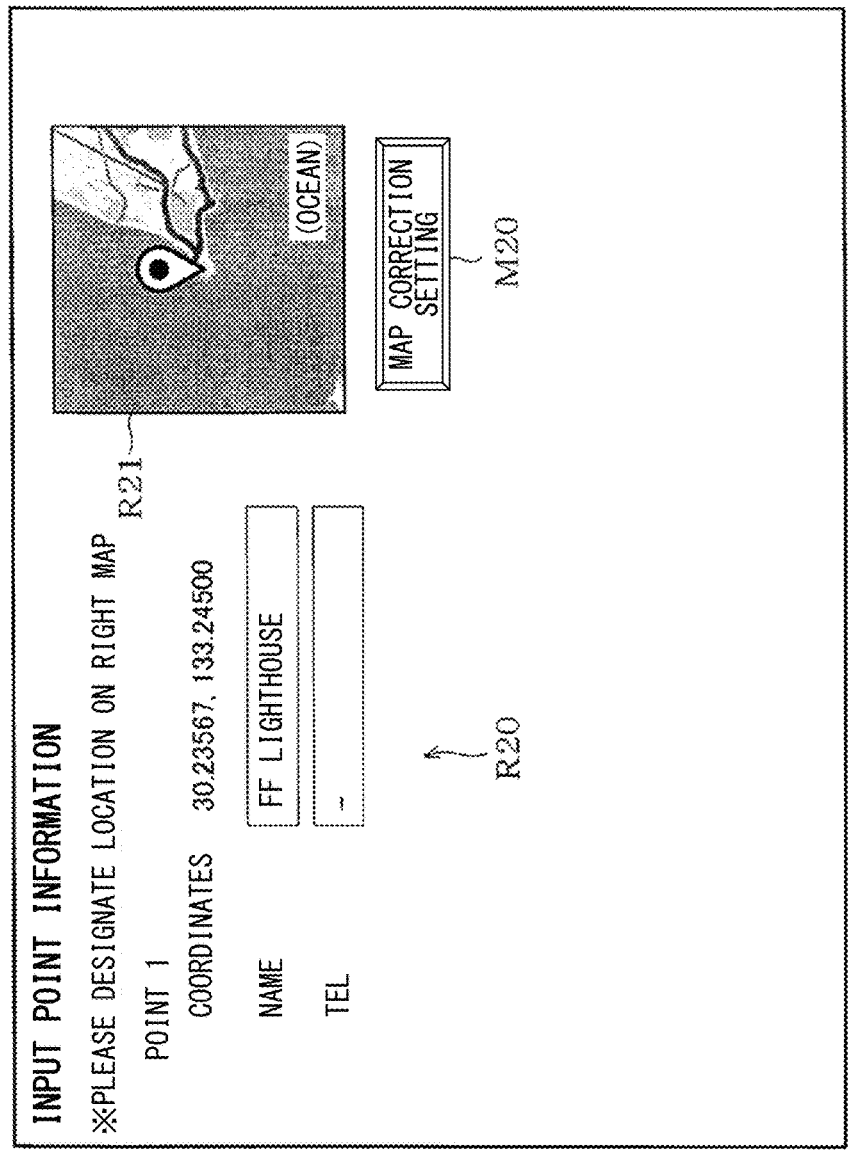
FIG. 13 is a diagram showing an example of the input screen for the point information in a situation D.
Figure 14:
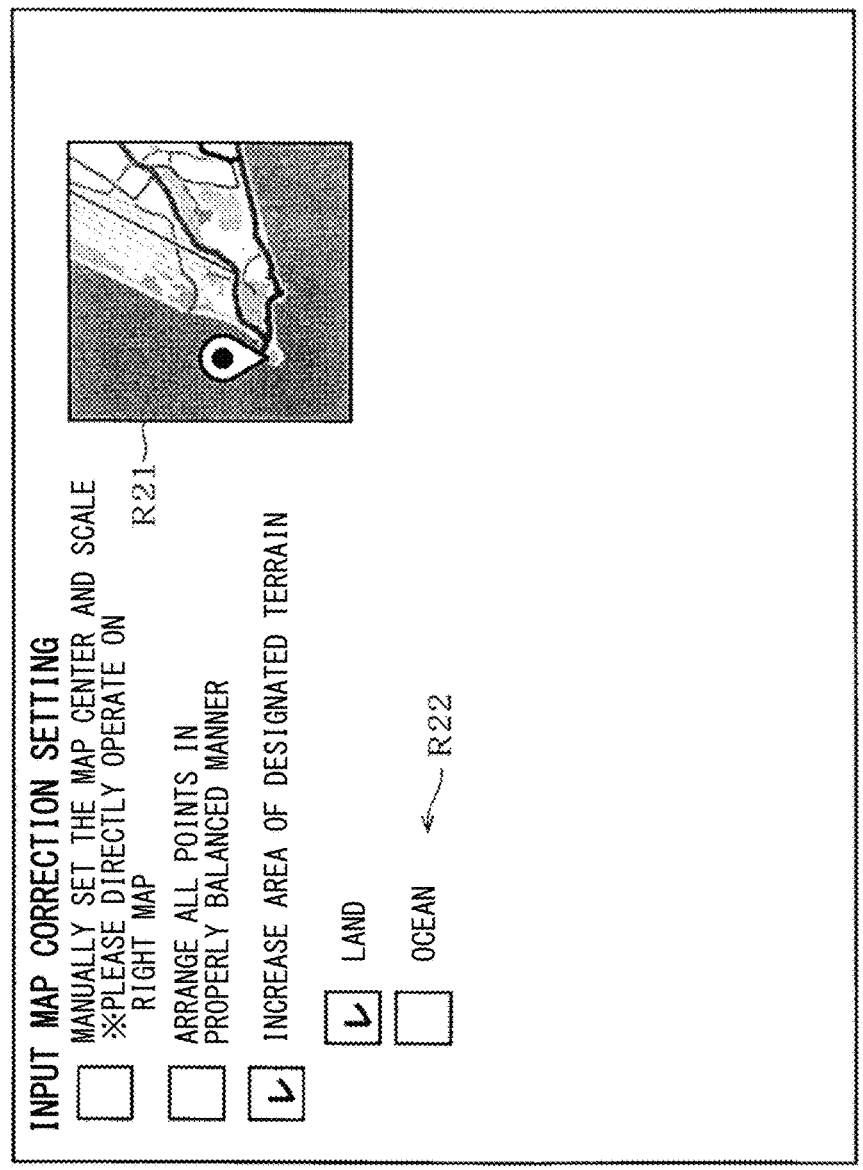
FIG. 14 is a diagram showing a first example of the input screen for the map correction setting in the situation D.
Figure 15:
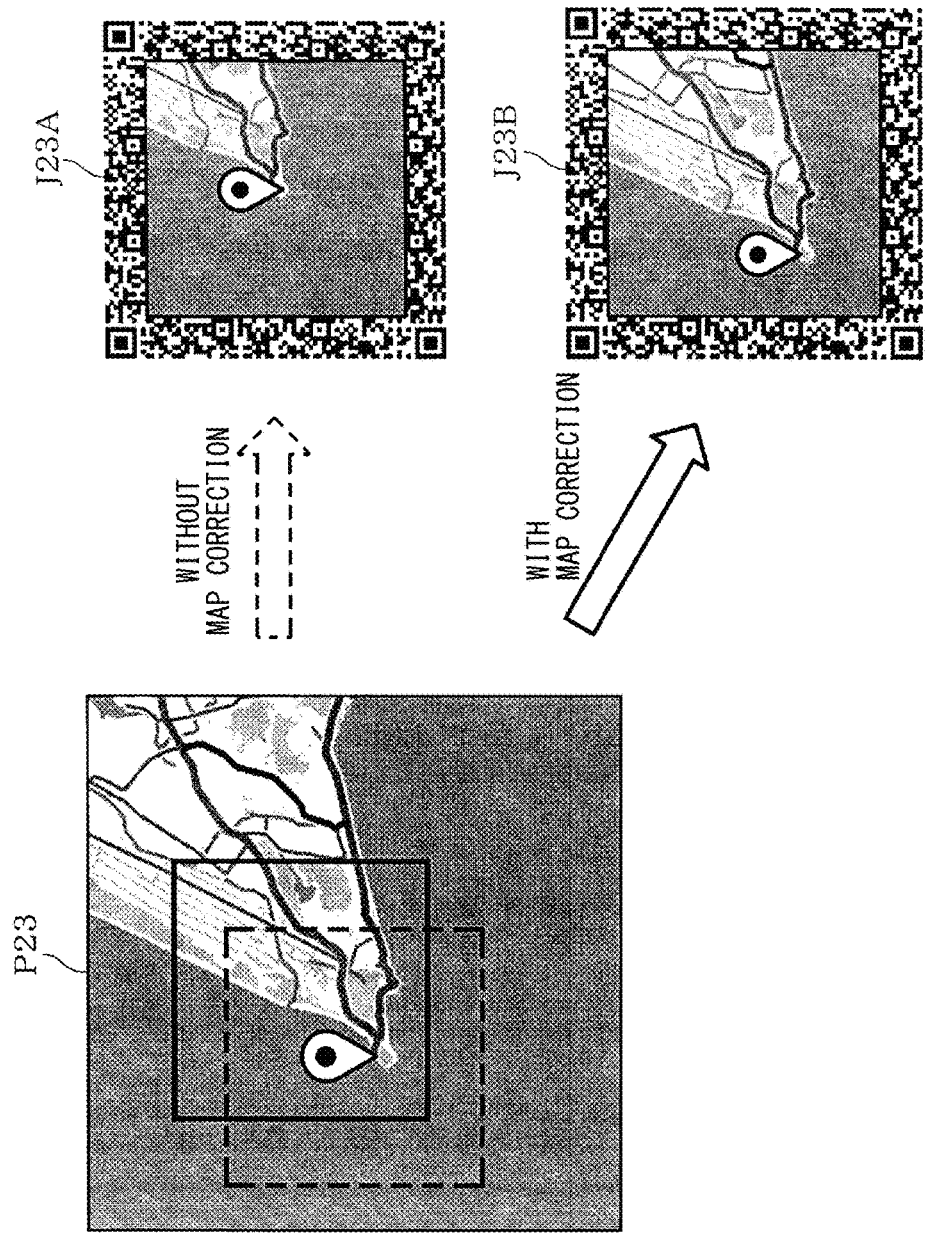
FIG. 15 is a diagram showing an example of the information code generated in the situation D, together with a reference example.

<Mode D: Case of Setting the Display Range Based on Terrain Information. Refer to FIGS. 13 to 15>.

As shown in FIG. 13, the mode D is an example in which point information of, for example, an FF lighthouse is entered from the point information input screen. Since the lighthouse is located close to a coast, it is assumed that an ocean (corresponding to a specific type of terrain in the present embodiment) is spreading around the lighthouse. For that reason, although there is a difference depending on an actual terrain, in a map image centered on the FF lighthouse, for example, as shown in the map display area R21, there is a possibility that the ocean occupies most of the map image.

In this case, it is considered that the position of the FF lighthouse becomes more easily understood with a reduction in an ocean region and an increase in a land region corresponding to the route to the FF lighthouse. As described above, since the terrain information, which is information capable of specifying the type of the terrain, is registered in the map data stored in the DB 32, the terrain information can be acquired as environment information.

In view of the above, when the type of the terrain specified by the terrain information includes a specific type of terrain set in advance, the information code generation apparatus 30 sets the display range according to the display condition set for the specific type of terrain.

In the case of the present embodiment, "land" and "ocean" are set as the specific types of terrain, as shown in FIG. 14, for example. As the type of the terrain, other terrain such as mountains, forests, or lakes may be selectable. Further, in the case of the present embodiment, "increase area of the designated terrain" is set as the display condition.

For that reason, when "land" is designated as the terrain as shown in FIG. 14, for example, the information code generation apparatus 30 adjusts the center position and/or the display scale of the map image so as to enlarge the area of the land in the map image. As a result, as compared with the map image shown in FIG. 13, the map image shown in FIG. 14 is reduced in the area of the ocean, which is the specific type of terrain.

Then, the information code generation apparatus 30 generates the information code based on the map image of the set display range. In this case, as shown in FIG. 15, in the case of no map correction, an information code J23A integrated with a map image having relatively large ocean area is generated.

On the contrary, in the case where there is a map correction, an information code J23B integrated with a map image having relatively large land area is generated.

In this way, with a reduction in the area of the ocean unsuitable for grasping the position, in other words, with an increase in the area of the land that is useful for grasping the position, the position of the FF lighthouse can be presented in the more easy-to-understand manner.

In addition, in the mode D, one display condition is exemplified, but multiple display conditions may be selectable or may be simultaneously used. For example, a display condition of minimizing an area in which the specific type of terrain is displayed, or setting the area in which the specific type of terrain is displayed to a predetermined ratio or less may be employed. Further, a condition for adjusting both the center position and the display scale may be employed.

Further, as in the modes A to C, conditions that the peripheral POI is included in the display range, the nearest POI is included in the display range, and that the multiple destination positions are included in the display range may be combined together.

In the case of the example of FIG. 15, if the display scale is increased more (that is, if the map is enlarged more), only the land can be displayed. However, in that case, since the position cannot be grasped, if the display conditions for minimizing the area or setting the area to a predetermined ratio or less are set, it is desirable to provide the display scale with a certain degree of limit. For example, a condition for minimizing the area of the ocean in a default such as a display scale set at the time of entering the point information, a condition for permitting adjustment of the scale of ±1 stage from an initial value, and the like are conceivable.

According to the above-described embodiments, the following advantages can be obtained.

The information code generation apparatus 30 according to the embodiment includes: the setting unit 34 that specifies the destination position based on the position specifying information included in the coding information for generating the information code, acquires the environment information which is information on the peripheral environment of the specified destination position from the DB 32, and adjusts the center position and/or the display scale to be displayed as the map image based on the destination position and the acquired environment information to set the display range to be displayed as the map image; and the information code generation unit 35 that acquires the map image in the display range set by the setting unit 34 from the DB 32, and generates the information code integrated with the acquired map image.

With such a configuration, in the information code generated by the information code generation apparatus 30, the destination position and the peripheral environment around the destination position are displayed. As a result, the user can grasp a positional relationship between the destination position and a building or the like existing around the destination position, and the user can grasp where the destination position is. Therefore, when generating the information code integrated with the map image, the destination position can be presented in an easy-to-understand manner to the user who sees the information code in an easy-to-understand manner.

The information code generation program including process of specifying the destination position based on the position specifying information included in the coding information for generating the information code, the process of acquiring the environment information which is information on the peripheral environment of the specified destination position from the DB 32, and adjusting the center location and/or the display scale to be displayed as the map image based on the destination position and the acquired environment information to set the display range to be displayed as the map image, and the process of acquiring the map image in the set display range from the DB 32, and generates the information code integrated with the acquired map image is executed. As a result, the same advantages as those in the information code generation apparatus 30 can be obtained.

In addition, the environment information includes the POI information that can specify the POIs existing around the destination position. In other words, the information code generation apparatus 30 selects one or more POIs to be displayed on the map image among the POIs specified by the POI information, and sets an area including the destination position and the selected POI as the display range. As a result, the POIs in the vicinity of the destination position, for example, a station, a department store, and so on can be displayed as markers in the map image, thereby making it easier to grasp the destination position. In this case, the selection of a large facility or a famous facility would make it easier to understand the position.

In this situation, the information code generation apparatus 30 sets the display range to place the specific type of POI closest to the destination position at a center position when the POIs specified by the POI information include a preset specific type of POI. As a result, for example, in the case where the multiple POIs are registered in the DB 32, and the map image is crowed if all of those POIs are displayed, an appropriate map image can be selected. This is significant when it is desired to present multiple pieces of information (destination position and POI) with a relatively small size like the information code.

Alternatively, when the POIs specified by the POI information include the multiple POIs of the preset specific type, the information code generation apparatus 30 may set the display range so as to include all of the specific type of POIs. In this case, the type of POI may be changed between when selecting the nearest POI and when including all of the POIs. For example, it is conceivable to set a display range that includes the nearest one station and all of the bus stops. This makes it possible to present more pieces of information to the user, for example, the number of options of the route when the user moves is increased.

Also, the information code generation apparatus 30 sets the area including all of the destination positions as the display range when there are multiple destination positions. As a result, the information code generation apparatus 30 can easily present all of the information that the producer of the information code wishes to present.

In addition, the information code generation apparatus 30 sets the area including a route as the display range when there are the multiple destination positions, and the route is present between the respective destination positions. As a result, the information code generation apparatus 30 can visually present not only the destination position but also the travel route. Further, the contents of the provided information can be grasped to a certain extent even without reading the information code.

When an object location different from the destination position or position information that can specify the object location is designated, and a route is present between the destination position and the target position, the information code generation apparatus 30 sets the area including the route as the display range. In that case, the nearest POI described above may be set as the target position. As a result, the information code generation apparatus 30 can visually present not only the destination position but also the travel route.

In addition, the information code generation apparatus 30 acquires the environment information including the terrain information that is information capable of specifying the type of a terrain, and sets the display range according to a display condition set for the specific type of terrain when the type of the terrain specified by the terrain information includes a preset specific type of terrain. This makes it possible to reduce the area of the ocean in the map image, for example, as described above. The map image region of the information code assumed to be generated with a relatively small size is effectively utilized.

In addition, the information code generation apparatus 30 can receive the operation of the code creator, and sets the display range according to at least one designation of the designation of the center location and/or the display scale of the map image, the designation of the center position by designating the amount of deviation from the destination position, the designation of the center position and/or the display scale by inputting the target position different from the destination position or position information capable of specifying the target position, and the direct designation of the display range. As a result, the information code generation apparatus 30 can specify the display range finely, and can display the map image according to the intention of the code creator.

In the present disclosure, the setting unit 34 and the information code generation unit 35 may be provided as an information code generation program product including instructions to be implemented by a computer and stored in a computer-readable non-transitory tangible storage medium. The processing performed by the setting unit 34 and the information code generation unit 35 may be provided as an information code generating method.

First Reference Example

Hereinafter, a first reference example will be described with reference to FIGS. 16 to 21. In the first embodiment, a QR code (registered trademark) is generated as the information code. For that reason, in the following description, the information code is also referred to as a QR code for the sake of convenience, and information coding is also referred to as QR coding for the sake of convenience.

Figure 16:
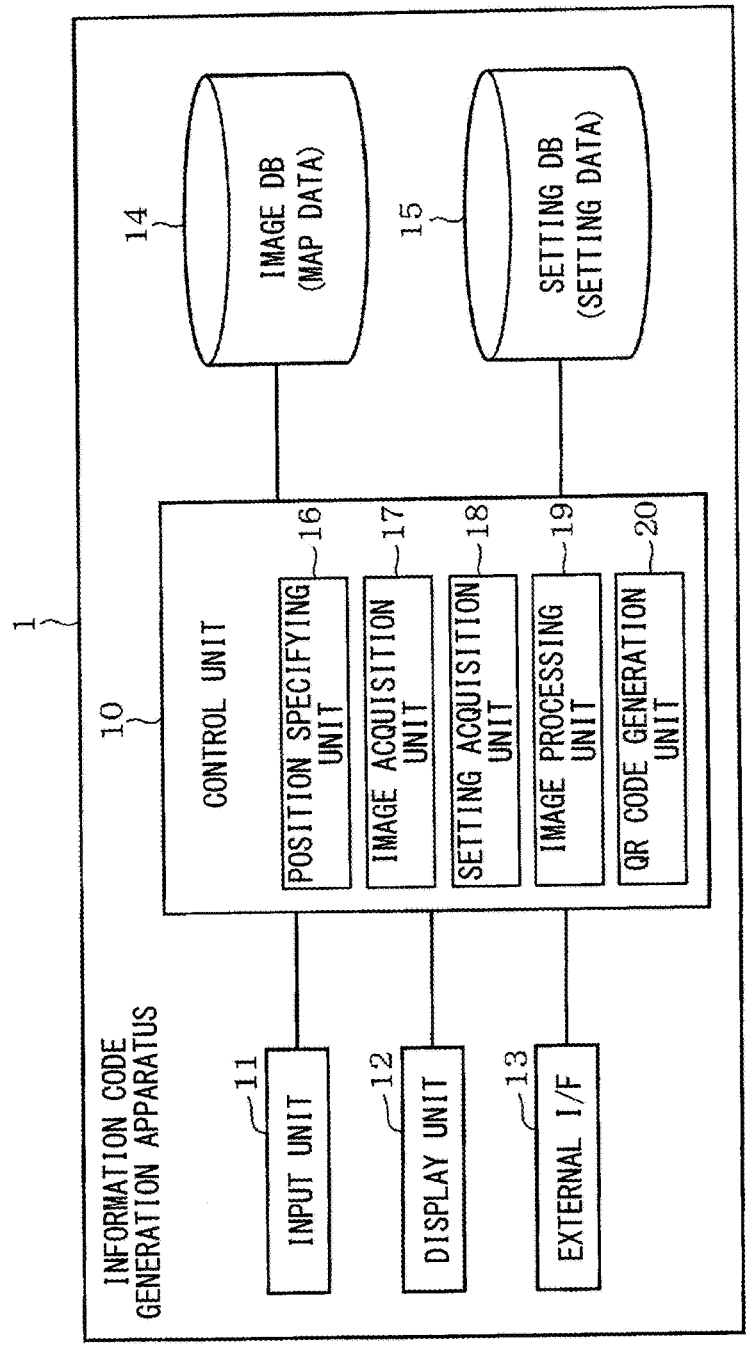
FIG. 16 is a diagram schematically illustrating an electric configuration of an information code generation apparatus according to a first reference example of the present disclosure.

As illustrated in FIG. 16, an information code generation apparatus 1 includes a control unit 10, an input unit 11, a display unit 12, an external I/F 13, an image database 14 (hereinafter referred to as image DB), and a setting database 15 (hereinafter referred to as setting DB). The information code generation apparatus 1 according to the present embodiment is configured by a so-called personal computer. For that reason, the control unit 10 is configured by a CPU of the personal computer, the input unit 11 is configured by a keyboard or a mouse, and the display unit 12 is configured by a display. In the present embodiment, coding information for generating a QR code (information code) is input from the input unit 11, and the generated QR code is displayed on a display unit 12. The external I/F 13 is configured by, for example, a network interface or a memory card interface.

The control unit 10 includes a position specifying unit 16, an image acquisition unit 17, a setting acquisition unit 18, an image processing unit 19, and a QR code generation unit 20 (corresponding to information code generation unit). Although described in detail later, the position specifying unit 16 determines whether the position specifying information is included in the coding information for generating the QR code, or not, and specifies the position when the position specifying information is included in the coding information. The image acquisition unit 17 acquires an image that can visually present a type of information provided by the generated QR code from the image DB 14 on the basis of the coding information for generating the QR code. In the present embodiment, the image acquisition unit 17 acquires a map image including a vicinity of the position specified by the position specifying unit 16, and map data corresponding to the map image from the image DB 14.

The setting acquisition unit 18 acquires setting in processing the map image from setting data stored in the setting DB 15. The image processing unit 19 processes the map image to be integrated with (superimposed on in the present embodiment) the QR code on the basis of the map data acquired by the image acquisition unit 17.

The image processing unit 19 processes the map image on the basis of the combination of settings registered in the setting data according to the intended purpose for displaying the QR code. The QR code generation unit 20 functions as the information code generation unit that generates the QR code on the basis of the coding information while generating the QR code on which the acquired image is superimposed when the image has been acquired by the image acquisition unit. The position specifying unit 16, the image acquisition unit 17, the setting acquisition unit 18, the image processing unit 19, and the QR code generation unit 20 are realized in a software fashion by a program executed by the control unit 10 in the present embodiment.

The image DB 14 and the setting DB 15 are each configured by a recording medium such as a hard disk device. In FIG. 16, the image DB 14 and the setting DB 15 are illustrated, separately, but are configured by a single hard disk in the present embodiment.

The image DB 14 stores the map data in the present embodiment. In the map data, data for displaying the map image including a vicinity of a certain position such as roads, rivers, stations, lines, and various facilities is registered. In this case, if the position to be displayed is changed, the map image is also naturally changed. In other words, the map image acquired by the above-mentioned image acquisition unit 17 is not fixed, and varied each time. The map image corresponds to an image that can visually present the type of information provided by the generated QR code. The map image can be displayed in color, and the QR code is displayed in color even when the map image is superimposed on the QR code as will be described later. The map image may be displayed in monochrome.

In more detail, in the present embodiment, the information provided by the QR code is information related to the position. The information related to the position is provided as information for specifying a position of an event venue in an information magazine in which, for example, event information, leisure information, or the like is published. As a result, a route to a destination can be grasped to some extent by merely viewing the QR code. A person can be guided to the position read from the QR code, that is, the destination, for example, in cooperation with a navigation application. In other words, the person can visually grasp that the position information is provided by the QR code by merely viewing the QR code.

In this situation, when the map image is superimposed on the QR code as it is, there is a risk that the map is difficult to view. For that reason, the information code generation apparatus 1 processes the map image by the above-mentioned image processing unit 19 in order to easily view the map, that is, so as to grasp the position. In this situation, various settings for processing the map image are registered in the setting DB 15. In the present embodiment, the following techniques are set in the setting data.

Setting in highlighting specific data included in the map data: Setting for highlighting specific data such as main roads, railways, rivers, and boundaries of administrative divisions in displaying the map image on the basis of the map data. For example, the main roads can be thickly displayed, a display color of the main roads can be changed, or an outline of the main roads can be clarified to highlight the roads. The determination of where the main roads are may be performed according to determination criteria such as road widths and national roads on the basis of the map data. In the present embodiment, those determination criteria are also registered in the setting data.

Setting in obscuring specific data included in the map data: Setting for displaying characters of place names, etc., narrow streets, unnecessary facilities, or the like obscurely, in other words, ambiguously, in displaying the map image on the basis of the map data. For example, the characters or the narrow streets can be displayed ambiguously by deleting the characters or the narrow streets, changing a display color to bend in a background color, reducing a display size, or the like.

Setting in displaying a mark on the map image: Setting for placing a symbol or the like as a target on the map image in displaying the map image on the basis of the map data, to easily recognize noteworthy information. For example, where a destination is can be grasped by, for example, displaying a destination mark on the map image.

Setting in simplifying specific data included in the map data: Setting for simplifying and displaying complex terrains or the appearance of facilities in displaying the map image on the basis of the map data. For example, the complex terrains such as a coastline or a hill can be simplified to display the complex terrains in a state where the shape of the complex terrains is easily grasped even while grasping the shape.

Setting in changing a display scale of the map image to be displayed: Setting for changing an area to be displayed in displaying the map image on the basis of the map data. For example, $1/5000$ is set in displaying the map image of an urban area, and $1/100000$ is set in displaying the map image including highways.

Type of the map to be displayed: Setting the map data that is a basis of the map image to be displayed such as a road map, a route map, or a town map.

As illustrated in FIG. 17, various combinations are registered according to an intended purpose for displaying the QR code. For example, as the information included in the coding information, when the intended purpose of the QR code is "guidance for vehicle", the combination of the type of the map being "road map", the display scale being "$1/100000$", and a processing method being "highlight main road and main river" and "delete narrow street" is registered. When the intended purpose of the QR code is "guidance for walk from the nearest station", the combination of the type of the map being "town map", the display scale being "$1/5000$", and the processing method being "highlight station" and "highlight main building" is registered. When the intended purpose of the QR code is "guidance for train to the nearest station", the combination of the type of the map being "route map", the display scale being "$1/50000$", and the processing method being "highlight nearest station" and "highlight transfer station" is registered. Those setting data is an example, and it is needless to say that other combinations may be registered.

The information code generation apparatus 1 configured as described above generates the information code that can visually grasp the type of information to be provided as follows. Meanwhile, since a technique for generating the QR code per se and a technique for coloring the QR code per se are well known, a description of those techniques will be omitted. The respective processing is performed by the position specifying unit 16, the image acquisition unit 17, the setting acquisition unit 18, the image processing unit 19, and the QR code generation unit 20 described above. For simplification of the description, the information code generation apparatus 1 will be mainly described.

Figure 18:
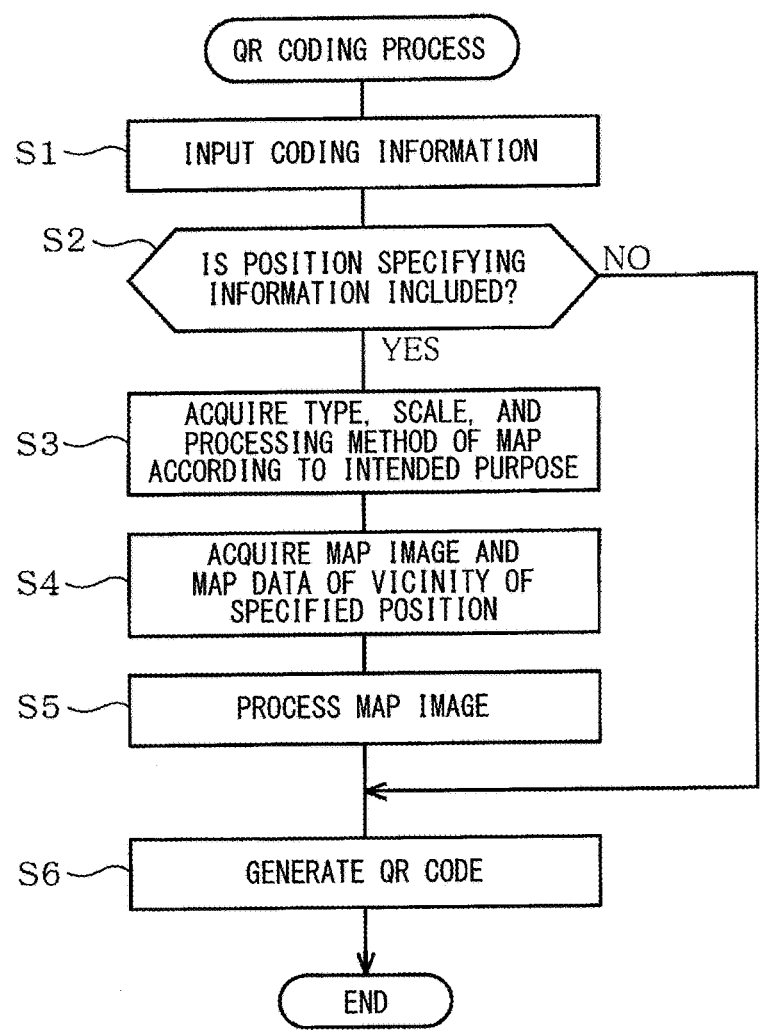
FIG. 18 is a diagram showing a flow of an information coding process.
Figure 19:
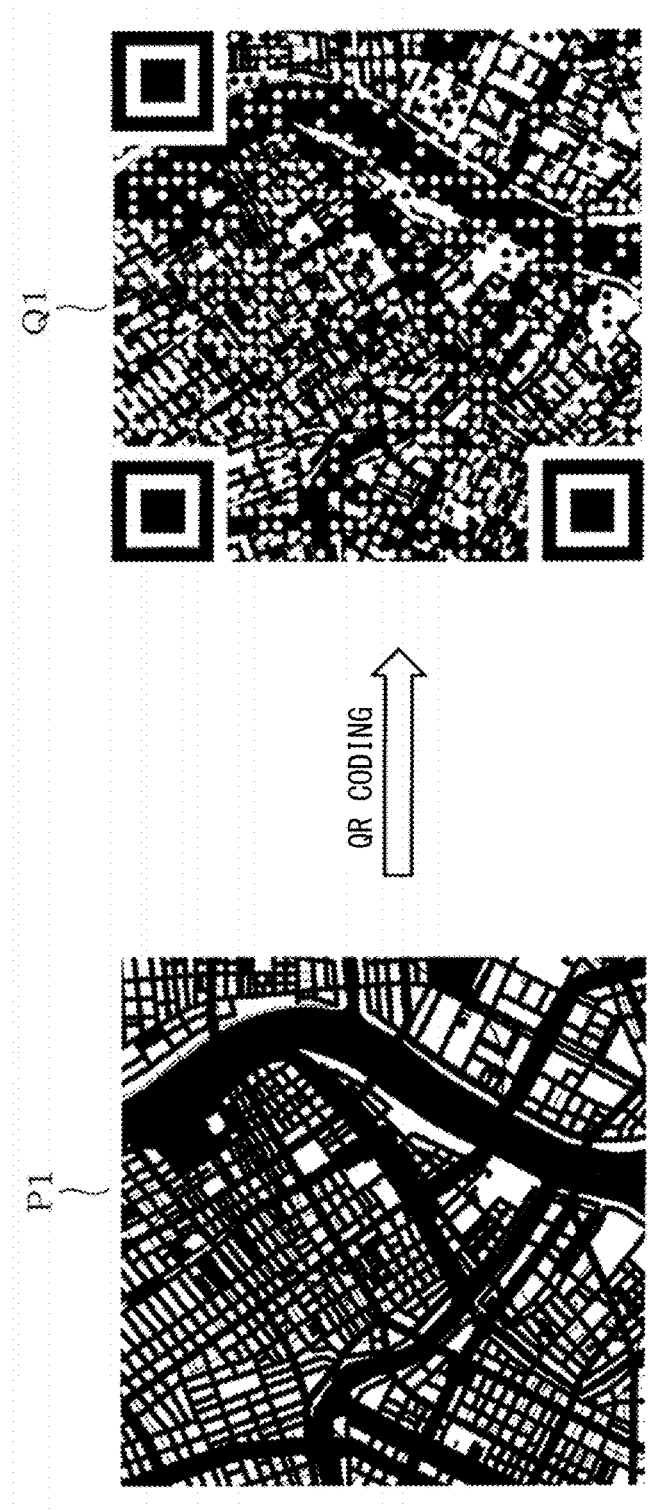
FIG. 19 is a diagram schematically illustrating an example in which an unprocessed map image is subjected to information coding.
Figure 20:
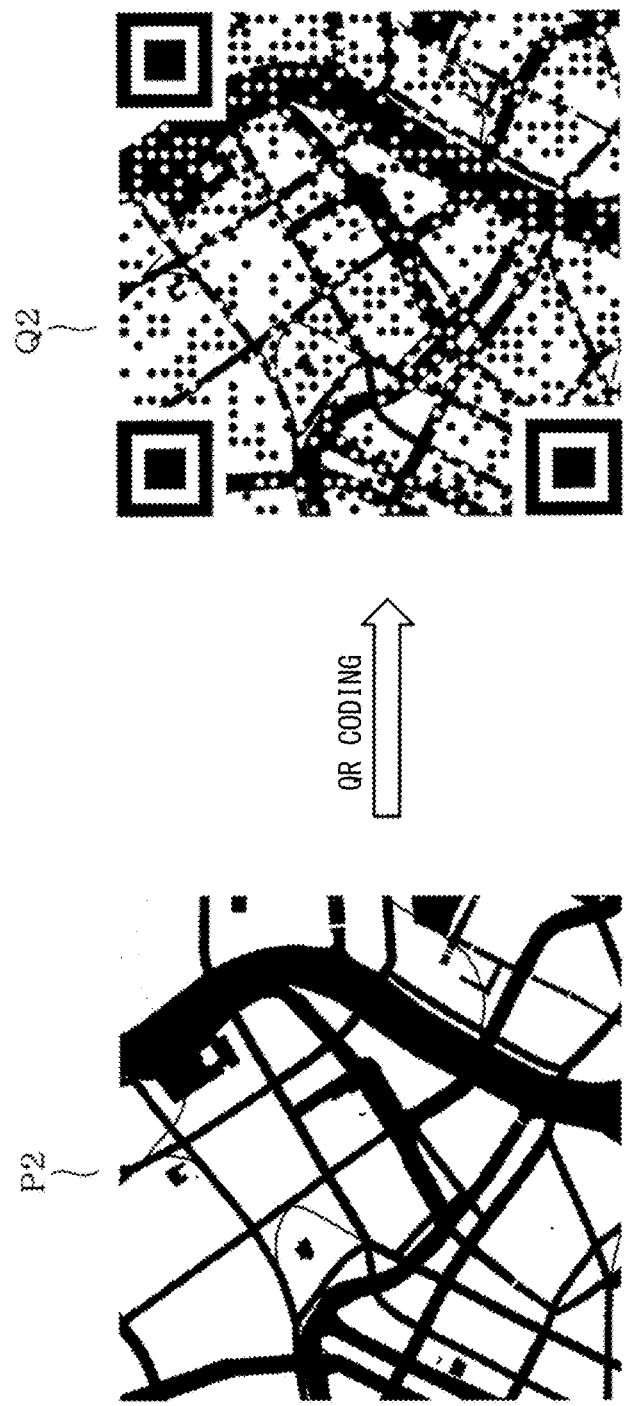
FIG. 20 is a diagram schematically illustrating an example in which a processed map image is subjected to information coding.

Upon receiving the coding information (S1), the information code generation apparatus 1 determines whether the position specifying information is included, or not, in a QR code generation process illustrated in FIG. 18 (S2). The position specifying information is information that can specify a position in the information included in the coding information, which is information that can specify a point directly or indirectly, such as a latitude and a longitude, an address, a zip code, a telephone number, or a regional mesh code (JISX0410). The determination is performed by the position specifying unit 16. The processing in Step S2 corresponds to a position specifying process.

If it is determined that the position specifying information is not included in the coding information (no in S1), the information code generation apparatus 1 generates the QR code on the basis of the coding information (S6). The process in Step S6 corresponds to an information code generation process. In that case, the generated QR code is displayed in a general pattern of light and dark. This makes it difficult for a person to grasp the type of provided information by merely viewing the QR code.

On the contrary, if it is determined that the position specifying information is included in the coding information (yes in S1), the information code generation apparatus 1 extracts an intended purpose from the coding information, and acquires the setting of the type, the display scale, and the processing method of the map corresponding to the intended purpose (S3). The processing in Step S3 is a setting acquisition process for acquiring the setting from the setting data stored in the setting DB 15. The acquisition of the setting is performed by the setting acquisition unit 18. Subsequently, the information code generation apparatus 1 acquires a map image in the vicinity of the specified position, and map data for displaying the map image from the image DB 14 (S4). The process in Step S4 corresponds to an image acquisition process. The acquisition of the map image is performed by the image acquisition unit 17.

The acquired map image is an image in the vicinity of the specified position, and roads, facilities, and so on including the specified position are displayed in the map image. Specifically, various pieces of information is included as indicated by a map image P1 illustrated in FIG. 19. For that reason, when the map image is superimposed on the QR code as it is, the pattern of light and dark is superimposed on the map, and it is conceivable that the map image is difficult to view as shown in a QR code Q1.

Under the circumstance, the information code generation apparatus 1 processes the map image on the basis of the intended purpose and the setting acquired in Step S3 (S5). Specifically, if the intended purpose is, for example, "guidance for vehicle" described above, the information code generation apparatus 1 processes the map image through the processing method of "highlight main road and main river" and "deletion narrow street". The main roads, the main rivers, or the narrow streets can be determined by the map data. As a result, in the map image P1 illustrated in FIG. 19, the main roads are highlighted, and the narrow streets are deleted, as in a map image P2 illustrated in FIG. 20. The processing in Step S5 is map processing for processing the map image on the basis of the setting acquired in the setting acquisition unit 18. The processing of the map image is performed by the image processing unit 19.

The information code generation apparatus 1 generates the QR code with the use of the processed map image (S6). As a result, the information code generation apparatus 1 can generates the QR code that can visually grasp that the image represents a map even if the map is superimposed on the pattern of light and dark, and which position is shown on the map, as in a QR code Q2 illustrated in FIG. 20.

The present embodiment described above can obtain the following advantages.

The information code generation apparatus 1 acquires the image that can visually present the type of information provided by the generated information code (in the present embodiment, QR code) from the database on the basis of the coding information for generating the QR code, and generates the QR code integrated with (in the present embodiment, superimposed on) the acquired image. As a result, the person can grasp the type of provided information without scanning the QR code by merely viewing the QR code. In this situation, since the image is acquired on the basis of the coding information for generating QR code, the image can be changed according to information to be provided.

The information code generation apparatus 1 determines whether the position specifying information is included in the coding information, or not, and specifies the position if the position specifying information is included in the coding information, and acquires the map image including the vicinity of the specified position to generate the QR code on which the map image is superimposed. As a result, the information code generation apparatus 1 can visually provide multiple pieces of information by one QR code such that the person can visually grasp that the information provided by the QR code is indicative of the position, and can grasp the position by viewing the QR code.

In addition, a display space for presenting a caption indicating that the position specifying information is included in the QR code becomes unnecessary, and when a paper surface is limited as with magazines, the display space may not be restricted. Since a necessity that a creator of the QR code understands what information is provided is reduced, and there is no need to create a corresponding image, a work of generating the QR code can be easily performed.

Since the person can visually grasp that QR code is indicative of the position specifying information, the person can predict that a route guidance by, for example, a navigation application can be performed by scanning the QR code, and can be guided to a service having an added value exceeding a simple provision of information.

The information code generation apparatus 1 acquires the map data corresponding to the map image including the vicinity of the specified position, and processes the map image on the basis of the acquired map data. Because the map data includes information on roads and rivers, a display mode of the roads and the rivers can be changed on the basis of the map data. For example, the map data is processed to highlight the main roads, the map is easily viewed. Therefore, where the destination is can be grasped by merely viewing the QR code.

The information code generation apparatus 1 acquires the setting data in which the settings in processing the map image are registered from the setting DB 15, and processes the map image on the basis of the acquired settings. As a result, the information code generation apparatus 1 can process the map image according to the main intended purpose. Because the setting of the processing method is registered in advance, the amount of work by the creator can be reduced, and convenience can be improved.

The setting in highlighting the specific data included in the map data, the setting in obscuring the specific data included in the map data, the setting in displaying a mark on the map image, the setting in simplifying the specific data included in the map data, the setting in changing a display scale of the map image to be displayed, and the setting of the type of the map to be displayed, are registered in the setting data in advance. For that reason, what processing is to be performed in generating the QR code can be easily determined.

The above respective settings are registered according to the intended purpose for displaying the QR code. The information code generation apparatus 1 processes the map image on the basis of the combination of the settings corresponding to the intended purpose for displaying the QR code. As a result, the processing corresponding to the intended purpose can be performed, for example, such that the display scale is increased and the main roads are highlighted if the map data is for notification to a visitor by a vehicle from a distance, and the display scale is decreased and the railway is highlighted if the map data is for guidance from a station to a store. Therefore, the amount of work for the creator of the QR code can be reduced, and the convenience can be improved.

The advantages described above can be obtained such that the information code capable of visually grasping the type of provided information can be generated by causing the control unit 10 of the information code generation apparatus 1 to execute the image acquisition process for acquiring the image that can visually present the type of information provided by the generated information code from the database on the basis of the coding information for generating the information code, and the information code generation process for generating the information code on which the acquired image is superimposed when the image is acquired by the image acquisition process while generating the information code on the basis of the coding information.

In this case, the information code that can visually grasp that the information provided by the information code represents the position, and can grasp the position by viewing the information code by executing the position specifying process for specifying the position on the basis of the position specifying information, and acquiring the map image including the vicinity of the specified position in the image acquisition process can be generated.

Second Reference Example

Hereinafter, a second reference example will be described with reference to FIGS. 21 to 24B.

Figure 21:
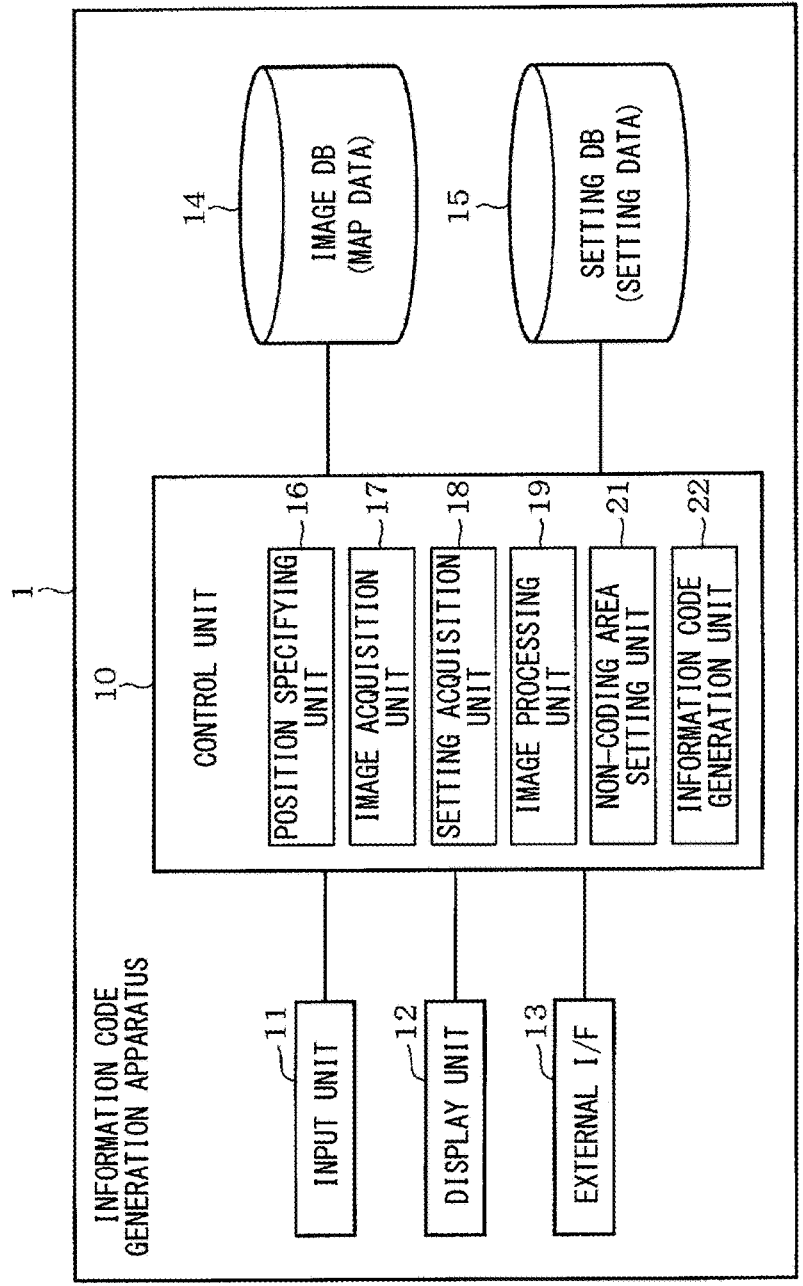
FIG. 21 is a diagram schematically illustrating an electric configuration of an information code generation apparatus according to a second reference example of the present disclosure.

As shown in FIG. 21, an information code generation apparatus 1 according to the present embodiment is provided with a non-coding area setting unit 21 in addition to the configuration of the first reference example. The non-coding area setting unit 21 sets a non-coding area which is a region not coded when an information code generation unit 22 generates the information code.

Figure 22A:
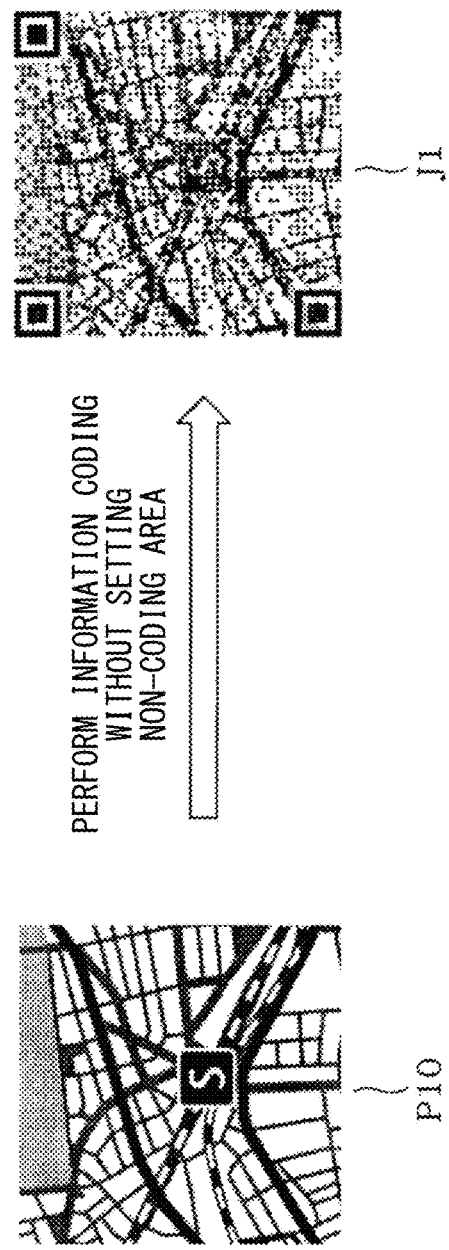
FIG. 22A is a diagram schematically showing an example of an information code generated when information coding is performed without setting a non-coding area.

For example, as shown in FIG. 22A, when a map image P10 is subjected to the information coding without setting the non-coding area, an entire information code J1 integrated with the map image P10 is coded. In that case, since the map image P10 is divided into, for example, a bright part and a dark part, the information included in the map image P10 sometimes becomes difficult to see. In other words, the information that could be presented in the map image P10 may drops out when the information has been coded into the information code J1. In the example of FIG. 22A, the information that can be read as "S" in the map image P10 is somewhat difficult to see in the coding information code J1.

In the case of FIG. 22A, since "S" is expressed relatively largely in the map image P10, although the information is recognizable to some extent even in the encoded state (that is, the information code J1). However, when the expression in the map image P10 is small, it is expected that the information become harder to see in the coded state. In this case, there is a need to use an image with an expression that can be discriminated to some extent when coded, and detailed information cannot be presented or it takes time and effort to select the image itself, resulting in a possibility that convenience may decrease.

Therefore, the information code generation apparatus 1 according to the present embodiment generates an information code which makes it easier to visually present information and the type of information as follows.

Figure 23:
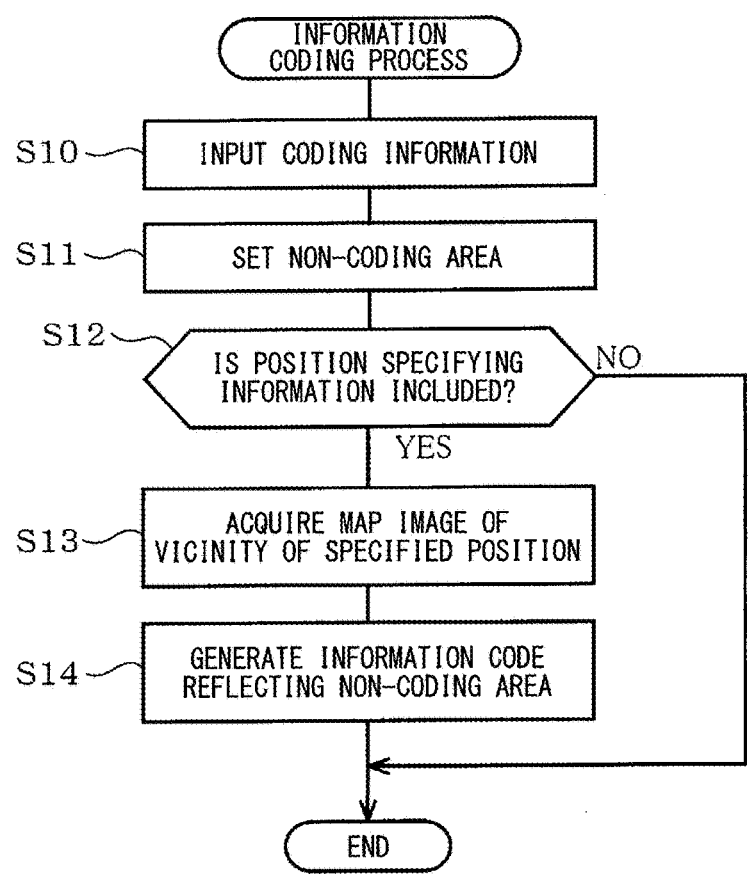
FIG. 23 is a diagram showing a flow of an information coding process.

Specifically, the information code generation apparatus 1 executes an information coding process shown in FIG. 23. For example, when the coding information as described in the first reference example is entered (S10), the non-coding area is set (S2). Since the non-coding area is a region in which coding is not performed as described above, the creator of the information code may set a portion including the information to be presented to be the non-coding area.

For example, in the case of generating the information code with a size of an area W as shown in FIG. 22B, if it is desired to make the non-coding area quadrangular, the creator inputs four points within the area W, that is, designates four vertices of a quadrangle, thereby being capable of setting the non-coding area R10. It should be noted that a user interface may be provided in which an original shape is registered in a setting DB 15 and the non-coding area is set by changing a size of the original shape.

When the non-coding area is set, the information code generation apparatus 1 determines whether the position specifying information is not included in the coding information, or not (S12). The position specifying information is the same as that described in the first reference example. The process in Step S12 corresponds to a position specifying process.

If it is determined that the position specifying information is not included in the coding information (no in S12), the information code generation apparatus 1 completes the processing. In the case where the position specifying information is not included, as described in the first reference example, a flow of generating the information code based on only the coding information without integrating (superimposing) the map image may be applied.

On the other hand, if it is determined that the position specifying information is included (yes in S12), the information code generation apparatus 1 acquires the map image in the vicinity of the specified position and the map data for displaying the map image from an image DB 14 (S13). The process in Step S4 corresponds to an image acquisition process.

Then, the information code generation apparatus 1 generates an information code reflecting the set non-coding area, in other words, an information code in which the non-coding area is not coded (S14). Specifically, as shown in FIG. 22B, the information code generation apparatus 1 generates information code J2 in which a region excluding the non-coding area R10 in the area W is coded. As a result, for example, an area in which "S" is expressed in the map image is not coded, and the user who sees the generated information code can clearly visually recognizes "S".

As described above, the information code generation apparatus 1 according to the present embodiment includes the non-coding area setting unit 21 for setting the non-coding area that is a region which is not coded, and the information code generation unit 22 generates an information code in which a region excluding the non-coded area set by the non-coding area setting unit 21 is coded. In other words, an image that can visually present the type of information and coding information are combined together to achieve both of visual recognition by the user and mechanical reading by a reading device or the like.

As a result, the same advantages as in the first reference example such that the information code that the person can visually grasp the type of information provided by the information code can be generated can be obtained. In addition, the non-coding area is set, thereby being capable of surely presenting the information that is wished to be presented by the creator of the information code to the user.

It should be noted that the flow of information coding processing shown in FIG. 23 may be changed as appropriate. For example, as will be described later, after acquiring the map image, setting of the non-coding area may be accepted while displaying the image. With such a flow of processing, it is considered that usability can be improved since the non-coding area can be set while viewing the acquired map image. However, when the coding information includes the point information, because it is conceivable that the position, the building, or the like specified by the point information is the information itself to be presented, even if the map image is not necessarily seen, sufficient effects may be obtained by setting the non-coding area, for example, in the vicinity of the center of the area W.

Further, the non-coding area is not limited to a rectangle illustrated in FIG. 22B, but may be a polygon, a circle, a region by a free hand of the creator, or the like.

Figure 24A:
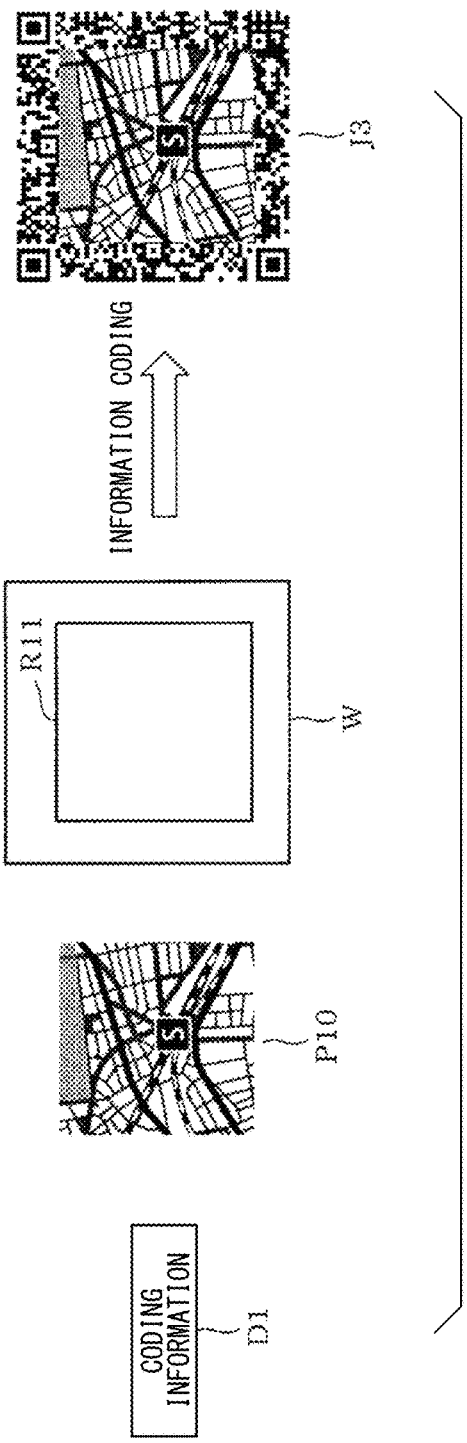
FIG. 24A is a diagram schematically showing another example (part 1) of integrating images.

Alternatively, for example, as shown in FIG. 24A, the map image P10 may be acquired based on the input coding information and a non-coding area R11 with a size of the map image P10 may be set. In that case, an information code J3 in which the periphery of the map image P10 is coded is generated.

Figure 24B:
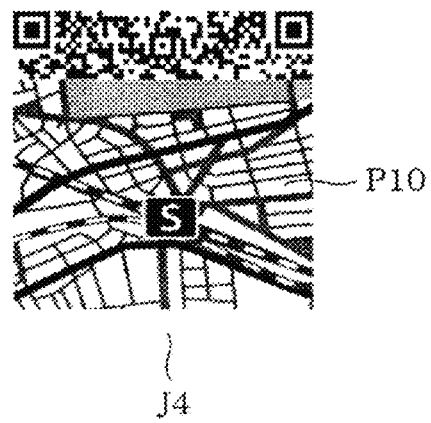
FIG. 24B is a diagram schematically showing another example (part 2) of integrating the images.

Alternatively, as shown in FIG. 24B, when it is desired to show the map larger, for example, the entire width direction of the information code area W may be set as the non-coding area. In that case, the image to be integrated is not limited to the map image P10, but may be, for example, a logo mark, a photograph of the product, or the like.

Other Embodiments

The present disclosure is not limited to the exemplifications of the above embodiment, but can be arbitrarily modified and expanded without departing from the spirit of the exemplifications.

In the first reference example, an example in which the map image is integrated (superimposed) is illustrated, but the integrated image is not limited to the map image. In other words, the type of information provided by the information code may be information other than the information related to the position. For example, the information code may be integrated with an image that can visually present a restraint or a hotel.

In the first reference example, the information code generation apparatus 1 is configured by one personal computer. Alternatively, the position specifying unit 16, the image acquisition unit 17, the setting acquisition unit 18, the image processing unit 19, and the QR code generation unit 20 may be distributed to multiple personal computers or a server or the like on the network. The input device and the display device may be distributed such that the coding information is input to the information code generation apparatus 1 by a personal computer or a smartphone of the creator. An information code generation system in which the image DB 14 and the setting DB 15 are installed in a server on a network, the coding information is transmitted to the server side from the information code generation apparatus 1 side, and an image selected on the server side is acquired may be structured. The image DB 14 and the setting DB 15 may be disposed in different servers.

The processing of the first reference example may be combined with the processing of the second reference example.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

What is claimed is:

1. An information code generation apparatus comprising:
   a setting unit that specifies a destination position based on position specifying information included in coding information for generating an information code, wherein the setting unit acquires, from a database, environment information indicating information on a peripheral environment of the specified destination position, and sets a display range of a map image to be displayed by adjusting at least one of a center position or a display scale based on the destination position and the acquired environment information; and
   an information code generation unit that acquires, from the database, the map image having the display range set by the setting unit, and generates the information code by integrating the acquired map image with the information code.

2. The information code generation apparatus according to claim 1, wherein
   the environment information includes POI (points of interest) information for specifying points of interest existing around the destination position, and
   the setting unit selects at least one POI to be displayed on the map image from the points of interest specified based on the POI information, and sets an area including the destination position and the selected POI as the display range of the map image.

3. The information code generation apparatus according to claim 2, wherein,
   when the points of interest specified based on the POI information include points of interest each having a preset specific type, the setting unit sets the display range of the map image such that one of the points of interest having the preset specific type and positioned closest to the destination position is displayed at the center position of the map image.

4. The information code generation apparatus according to claim 3, wherein,
   when the points of interest specified based on the POI information include points of interest each having the preset specific type, the setting unit sets the display range of the map image to include all of the points of interest having the preset specific type.

5. The information code generation apparatus according to claim 1, wherein,
   when the setting unit specifies a plurality of destination positions, the setting unit sets an area including all of the plurality of destination positions as the display range of the map image.

6. The information code generation apparatus according to claim 1, wherein,
   when the setting unit specifies a plurality of destination positions and at least one route is present between two of the plurality of destination positions, the setting unit sets an area including the at least one route as the display range of the map image.

7. The information code generation apparatus according to claim 1, wherein,
   when a target position different from the destination position or position information for specifying the target position is designated and a route is present between the destination position and the target position, the setting unit sets an area including the route as the display range of the map image.

8. The information code generation apparatus according to claim 1, wherein
   the environment information includes terrain information for specifying terrain types, and
   when the terrain types specified by the terrain information include a preset specific terrain type, the setting unit sets the display range of the map image according to a display condition set for the preset specific terrain type.

9. The information code generation apparatus according to claim 1, further comprising
   an operation input unit that receives an operation made by a user, wherein
   the setting unit sets the display range of the map image when the operation made by the user includes at least one of:
   (i) a designation of at least one of the center position or the display scale of the map image;
   (ii) a designation of the center position of the map image by designating a deviation amount from the destination position;
   (iii) a designation of at least one of the center position or the display scale of the map image by inputting a target position different from the destination position or inputting position information for specifying the target position; or
   (iv) a direct designation of the display range of the map image.

10. An information code generation program product stored in a computer-readable non-transitory tangible storage medium, the program product comprising instructions to be executed by a computer, the instructions for implementing:
- specifying a destination position based on position specifying information included in coding information for generating an information code;
- acquiring, from a database, environment information indicating information on a peripheral environment of the specified destination position;
- setting a display range of a map image to be displayed by adjusting at least one of a center position or a display scale based on the destination position and the acquired environment information;
- acquiring the map image having the set display range; and
- generating the information code by integrating the acquired map image with the information code.

* * * * *